United States Patent
Deshpande

(10) Patent No.: US 11,856,236 B2
(45) Date of Patent: Dec. 26, 2023

(54) SYSTEMS AND METHODS FOR SIGNALING SEQUENCE PARAMETER INFORMATION IN VIDEO CODING

(71) Applicant: Sharp Kabushiki Kaisha, Sakai (JP)

(72) Inventor: Sachin G. Deshpande, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/960,957

(22) Filed: Oct. 6, 2022

(65) Prior Publication Data

US 2023/0046969 A1 Feb. 16, 2023

Related U.S. Application Data

(63) Continuation of application No. 17/338,776, filed on Jun. 4, 2021, now Pat. No. 11,503,342.

(60) Provisional application No. 63/037,350, filed on Jun. 10, 2020.

(51) Int. Cl.
| | | |
|---|---|---|
| *H04N 19/70* | (2014.01) | |
| *H04N 19/44* | (2014.01) | |
| *H04N 19/176* | (2014.01) | |
| *H04N 19/96* | (2014.01) | |
| *H04N 19/186* | (2014.01) | |

(52) U.S. Cl.
CPC ........... *H04N 19/70* (2014.11); *H04N 19/176* (2014.11); *H04N 19/186* (2014.11); *H04N 19/44* (2014.11); *H04N 19/96* (2014.11)

(58) Field of Classification Search
CPC .. H04N 19/119; H04N 19/132; H04N 19/176; H04N 19/177; H04N 19/186; H04N 19/70; H04N 19/96; H04N 19/44
See application file for complete search history.

(56) References Cited

U.S. PATENT DOCUMENTS

| | | | | |
|---|---|---|---|---|
| 2014/0086333 A1* | 3/2014 | Wang | .................... | H04N 21/235 |
| | | | | 375/240.26 |
| 2017/0094277 A1* | 3/2017 | Chen | ...................... | H04N 19/13 |
| 2022/0232257 A1* | 7/2022 | Wang | .................. | H04N 19/463 |
| 2022/0286667 A1* | 9/2022 | Lu | ........................... | H04N 19/70 |
| 2022/0329872 A1* | 10/2022 | Hendry | ................. | H04N 19/82 |
| 2022/0394243 A1* | 12/2022 | Deng | ................... | H04N 19/119 |

FOREIGN PATENT DOCUMENTS

WO WO-2021061280 A1 * 4/2021 ............... H04N 1/64

OTHER PUBLICATIONS

"Overview of HEVC High-Level Syntax and Reference Picture Management"—Rickard Sjöberg et al., IEEE Transactions on Circuits and Systems for Video Technology, vol. 22, No. 12, Dec. 2012 (Year: 2012).*
Deshpande, "Systems and Methods for Signaling Sequence Parameter Information in Video Coding", U.S. Appl. No. 17/338,776, filed Jun. 4, 2021.

* cited by examiner

*Primary Examiner* — Mainul Hasan
(74) *Attorney, Agent, or Firm* — Keating & Bennett, LLP

(57) ABSTRACT

A device may be configured to signal sequence parameter information according to one or more of the techniques described herein. The sequence parameter set information may include in its second byte a syntax element specifying a chroma sampling relative to a luma sampling and a syntax element specifies a luma coding tree block size of each coding tree unit.

3 Claims, 6 Drawing Sheets

SYSTEMS AND METHODS FOR SIGNALING SEQUENCE PARAMETER INFORMATION IN VIDEO CODING

TECHNICAL FIELD

This disclosure relates to video coding and more particularly to techniques for signaling sequence parameter information for coded video.

BACKGROUND

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTCU1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, CA From the multiple descriptions of video coding tools, a resulting initial draft text of a video coding specification is described in "Versatile Video Coding (Draft 1)," 10$^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 9)," 18th Meeting of ISO/IEC JTC1/SC29/WG11 15-24 Apr. 2020, Teleconference, document JVET-R2001-vA, which is incorporated by reference herein, and referred to as JVET-R2001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

A method of decoding video data, the method comprising:
receiving a sequence parameter set including syntax elements corresponding to a coded video sequence;
parsing a first byte of the sequence parameter set including a first syntax element and a second syntax element, wherein the first syntax element provides an identifier for the sequence parameter set, and the second syntax element specifies a video parameter set identifier referred to by the sequence parameter set; and
parsing a second byte of the sequence parameter set including a third syntax element, a fourth syntax element, a fifth syntax element and a sixth syntax element, wherein the third syntax element specifies a maximum number of temporal sublayers that may be present in the coded video sequence referring to the sequence parameter set, the fourth syntax element specifies a chroma sampling relative to a luma sampling, the fifth syntax element specifies a luma coding tree block size of each coding tree unit, and the sixth syntax element specifies whether level information is present in the sequence parameter set.

A device comprising one or more processors configured to:
receive a sequence parameter set including syntax elements corresponding to a coded video sequence;
parse a first byte of the sequence parameter set including a first syntax element and a second syntax element, wherein the first syntax element provides an identifier for the sequence parameter set, and the second syntax element specifies a video parameter set identifier referred to by the sequence parameter set; and
parse a second byte of the sequence parameter set including a third syntax element, a fourth syntax element, a fifth syntax element and a sixth syntax element, wherein the third syntax element specifies a maximum number of temporal sublayers that may be present in the coded video sequence referring to the sequence parameter set, the fourth syntax element specifies a chroma sampling relative to a luma sampling, the fifth syntax element specifies a luma coding tree block size of each coding tree unit, and the sixth syntax element specifies whether level information is present in the sequence parameter set.

A method of signaling parameters for video data, the method comprising:
   signaling a first syntax element provides an identifier for a sequence parameter set;
   signaling a second syntax element specifies a video parameter set identifier referred to by the sequence parameter set;
   signaling a third syntax element specifying a maximum number of temporal sublayers that may be present in a coded video sequence referring to the sequence parameter set;
   signaling a fourth syntax element specifying a chroma sampling to a luma sampling;
   signaling a fifth syntax element specifying a luma coding tree block size of each coding tree unit;
   signaling a sixth syntax element specifying whether level information is present in the sequence parameter set;
   signaling a first byte of the sequence parameter set including the first syntax element and the second syntax element; and
   signaling a second byte of the sequence parameter set including the third syntax element, the fourth syntax element, the fifth syntax element and the sixth syntax element.

DETAILED DESCRIPTION

Figure 1:
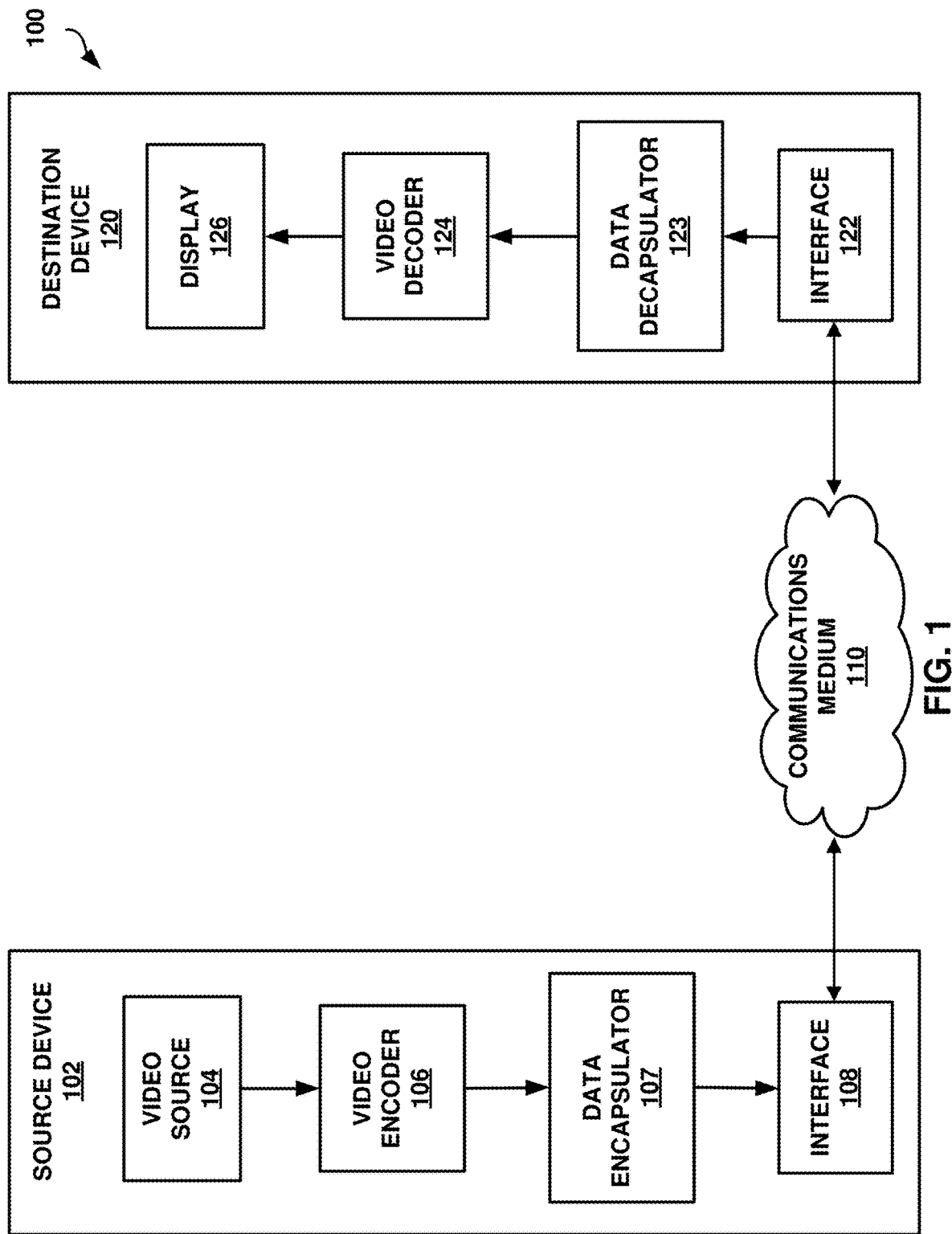
FIG. 1 is a block diagram illustrating an example of a system that may be configured to encode and decode video data according to one or more techniques of this disclosure.

In general, this disclosure describes various techniques for coding video data. In particular, this disclosure describes techniques for signaling parameter information for coded video data. It should be noted that although techniques of this disclosure are described with respect to ITU-T H.264, ITU-T H.265, JEM, and JVET-R2001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-R2001. Thus, reference to ITU-T H.264, ITU-T H.265, JEM, and/or JVET-R2001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling parameters for video data comprises signaling a syntax element in a sequence parameter set syntax structure specifying a maximum number of temporal sublayers that may be present in each coded video sequence referring to the sequence parameter set, signaling a syntax element specifying a chroma sampling, and signaling a syntax element specifying a luma coding tree block size, wherein the syntax element specifying a chroma sampling and the syntax element specifying a luma coding tree block size immediately follow the syntax element specifying a maximum number of temporal sublayers.

In one example, a device comprises one or more processors configured to signal a syntax element in a sequence parameter set syntax structure specifying a maximum number of temporal sublayers that may be present in each coded video sequence referring to the sequence parameter set, signal a syntax element specifying a chroma sampling, and signal a syntax element specifying a luma coding tree block size, wherein the syntax element specifying a chroma sampling and the syntax element specifying a luma coding tree block size immediately follow the syntax element specifying a maximum number of temporal sublayers.

In one example, a non-transitory computer-readable storage medium comprises instructions stored thereon that, when executed, cause one or more processors of a device to signal a syntax element in a sequence parameter set syntax structure specifying a maximum number of temporal sublayers that may be present in each coded video sequence referring to the sequence parameter set, signal a syntax element specifying a chroma sampling, and signal a syntax element specifying a luma coding tree block size, wherein the syntax element specifying a chroma sampling and the syntax element specifying a luma coding tree block size immediately follow the syntax element specifying a maximum number of temporal sublayers.

In one example, an apparatus comprises means for signaling a syntax element in a sequence parameter set syntax structure specifying a maximum number of temporal sublayers that may be present in each coded video sequence referring to the sequence parameter set, means for signaling a syntax element specifying a chroma sampling, and means for signaling a syntax element specifying a luma coding tree block size, wherein the syntax element specifying a chroma sampling and the syntax element specifying a luma coding tree block size immediately follow the syntax element specifying a maximum number of temporal sublayers.

In one example, a method of decoding video data comprises parsing a syntax element in a sequence parameter set syntax structure specifying a maximum number of temporal sublayers that may be present in each coded video sequence referring to the sequence parameter set, parsing a syntax element specifying a chroma sampling, and parsing a syntax element specifying a luma coding tree block size, wherein the syntax element specifying a chroma sampling and the syntax element specifying a luma coding tree block size immediately follow the syntax element specifying a maximum number of temporal sublayers.

In one example, a device comprises one or more processors configured to parse a syntax element in a sequence parameter set syntax structure specifying a maximum number of temporal sublayers that may be present in each coded video sequence referring to the sequence parameter set, parse a syntax element specifying a chroma sampling, and parse a syntax element specifying a luma coding tree block size, wherein the syntax element specifying a chroma sampling and the syntax element specifying a luma coding tree block size immediately follow the syntax element specifying a maximum number of temporal sublayers.

In one example, a non-transitory computer-readable storage medium comprises instructions stored thereon that, when executed, cause one or more processors of a device to parse a syntax element in a sequence parameter set syntax structure specifying a maximum number of temporal sublayers that may be present in each coded video sequence referring to the sequence parameter set, parse a syntax element specifying a chroma sampling, and parse a syntax element specifying a luma coding tree block size, wherein the syntax element specifying a chroma sampling and the syntax element specifying a luma coding tree block size immediately follow the syntax element specifying a maximum number of temporal sublayers.

In one example, an apparatus comprises means for parsing a syntax element in a sequence parameter set syntax structure specifying a maximum number of temporal sublayers that may be present in each coded video sequence referring to the sequence parameter set, means for parsing a syntax element specifying a chroma sampling, and means for parsing a syntax element specifying a luma coding tree block size, wherein the syntax element specifying a chroma sampling and the syntax element specifying a luma coding tree block size immediately follow the syntax element specifying a maximum number of temporal sublayers.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may be halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-R2001, CTUs are partitioned according a quadtree plus multi-type tree (QTMT or QT+MTT) structure. The QTMT in JVET-R2001 is similar to the QTBT in JEM. However, in JVET-R2001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-R2001, slices are required to consist of an integer number of complete tiles or an integer number of consecutive complete CTU rows within a tile, instead of only being required to consist of an integer number of CTUs. It should be noted that in JVET-R2001, the slice design does not include slice segments (i.e., no independent/dependent slice segments). Thus, in JVET-R2001, a picture may include a single tile, where the single tile is contained within a single slice or a picture may include multiple tiles where the multiple tiles (or CTU rows thereof) may be contained within one or more slices. In JVET-R2001, the partitioning of a picture into tiles is specified by specifying respective heights for tile rows and respective widths for tile columns. Thus, in JVET-R2001 a tile is a rectangular region of CTUs within a particular tile row and a particular tile column position. Further, it should be noted that JVET-R2001 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
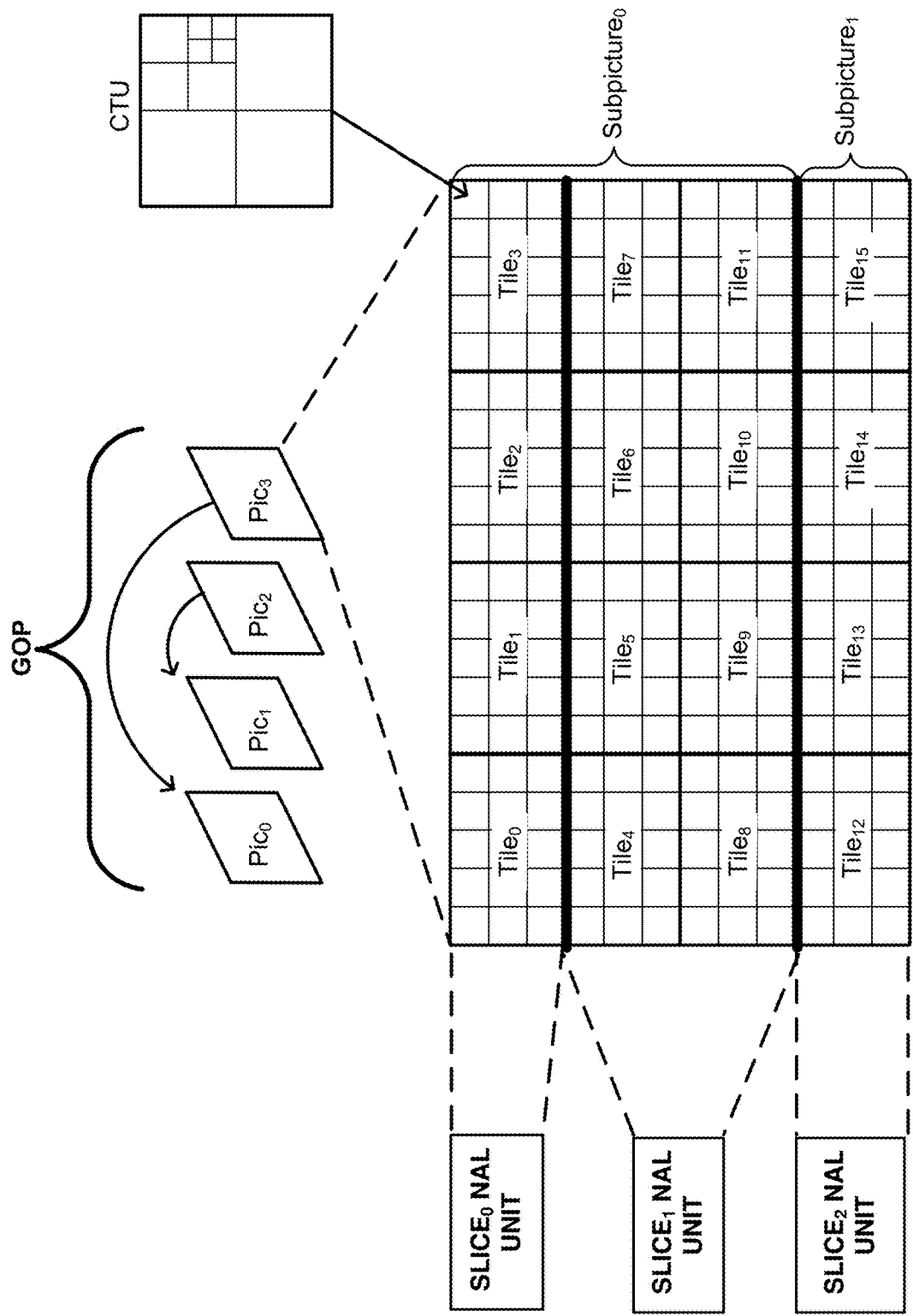
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, sub-divisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and Slice® NAL unit and $Slice_1$ NAL unit may be decoded and displayed. The encapsulation of slices of a picture into respective NAL unit data structures and sub-bitstream extraction are described in further detail below.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_2$ is illustrated as referencing $Pic_k$. Similarly, $Pic_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_k$, the DPB would include $\{Pic_0\}$; after decoding $Pic_k$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-R2001, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:

+ Addition

− Subtraction

Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

Further, the following mathematical functions may be used:

Log 2(x) the base-2 logarithm of x;

$$\text{Min}(x, y) = \begin{cases} x; & x <= y \\ y; & x > y \end{cases};$$

$$\text{Max}(x, y) = \begin{cases} x; & x >= y \\ y; & x < y \end{cases}$$

Ceil(x) the smallest integer greater than or equal to x.

With respect to the example syntax used herein, the following definitions of logical operators may be applied:

x && y Boolean logical "and" of x and y x||y Boolean logical "or" of x and y

! Boolean logical "not"

x ? y: z If x is TRUE or not equal to 0, evaluates to the value of y; otherwise, evaluates to the value of z.

Further, the following relational operators may be applied:

\> Greater than

\>= Greater than or equal to

< Less than

<= Less than or equal to

== Equal to

!= Not equal to

Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

se(v): signed integer 0-th order Exp-Golomb-coded syntax element with the left bit first.

tb(v): truncated binary using up to maxVal bits with maxVal defined in the semantics of the symtax element.

tu(v): truncated unary using up to maxVal bits with maxVal defined in the semantics of the symtax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

As described above, video content includes video sequences comprised of a series of pictures and each picture may be divided into one or more regions. In JVET-R2001, a coded representation of a picture comprises VCL NAL units of a particular layer within an AU and contains all CTUs of the picture. For example, referring again to FIG. 2, the coded representation of Pica is encapsulated in three coded slice NAL units (i.e., $Slice_0$ NAL unit, $Slice_1$ NAL unit, and $Slice_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in JVET-R2001, a NAL unit may be a VCL NAL unit or a non-VCL NAL unit. It should be noted that a VCL NAL unit includes slice header data, which provides information used for decoding the particular slice. Thus, in JVET-R2001, information used for decoding video data, which may be referred to as metadata in some cases, is not limited to being included in non-VCL NAL units. JVET-R2001 provides where a picture unit (PU) is a set of NAL units that are associated with each other according to a specified classification rule, are consecutive in decoding order, and contain exactly one coded picture and where an access unit (AU) is a set of PUs that belong to different layers and contain coded pictures associated with the same time for output from the DPB. JVET-R2001 further provides where a layer is a set of VCL NAL units that all have a particular value of a layer identifier and the associated non-VCL NAL units. Further, in JVET-R2001, a PU consists of zero or one PH NAL units, one coded picture, which comprises of one or more VCL NAL units, and zero or more other non-VCL NAL units. Further, in JVET-R2001, a coded video sequence (CVS) is a sequence of AUs that consists, in decoding order, of a CVSS AU, followed by zero or more AUs that are not CVSS AUs, including all subsequent AUs up to but not including any subsequent AU that is a CVSS AU, where a coded video sequence start (CVSS) AU is an AU in which there is a PU for each layer in the CVS and the coded picture in each present picture unit is a coded layer video sequence start (CLVSS) picture. In JVET-R2001, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in JVET-R2001, a bitstream may be described as including a sequence of AUs forming one or more CVSs.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In JVET-R2001, each of a video sequence, a GOP, a picture, a slice, and CTU may be associated with metadata that describes video coding properties and some types of metadata an encapsulated in non-VCL NAL units. JVET-R2001 defines parameters sets that may be used to describe video data and/or video coding properties. In particular, JVET-R2001 includes the following four types of parameter sets: video parameter set (VPS), sequence parameter set (SPS), picture parameter set (PPS), and adaption parameter set (APS), where a SPS applies to apply to zero or more entire CVSs, a PPS applies to zero or more entire coded pictures, a APS applies to zero or more slices, and a VPS may be optionally referenced by a SPS. A PPS applies to an individual coded picture that refers to it. In JVET-R2001, parameter sets may be encapsulated as a non-VCL NAL unit and/or may be signaled as a message. JVET-R2001 also includes a picture header (PH) which is encapsulated as a non-VCL NAL unit. In JVET-R2001, a picture header applies to all slices of a coded picture. JVET-R2001 further enables decoding capability information (DCI) and supplemental enhancement information (SEI) messages to be signaled. In JVET-R2001, DCI and SEI messages assist in processes related to decoding, display or other purposes, however, DCI and SEI messages may not be required for constructing the luma or chroma samples according to a decoding process. In JVET-R2001, DCI and SEI messages may be signaled in a bitstream using non-VCL NAL units. Further, DCI and SEI messages may be conveyed by some mechanism other than by being present in the bitstream (i.e., signaled out-of-band).

Figure 3:
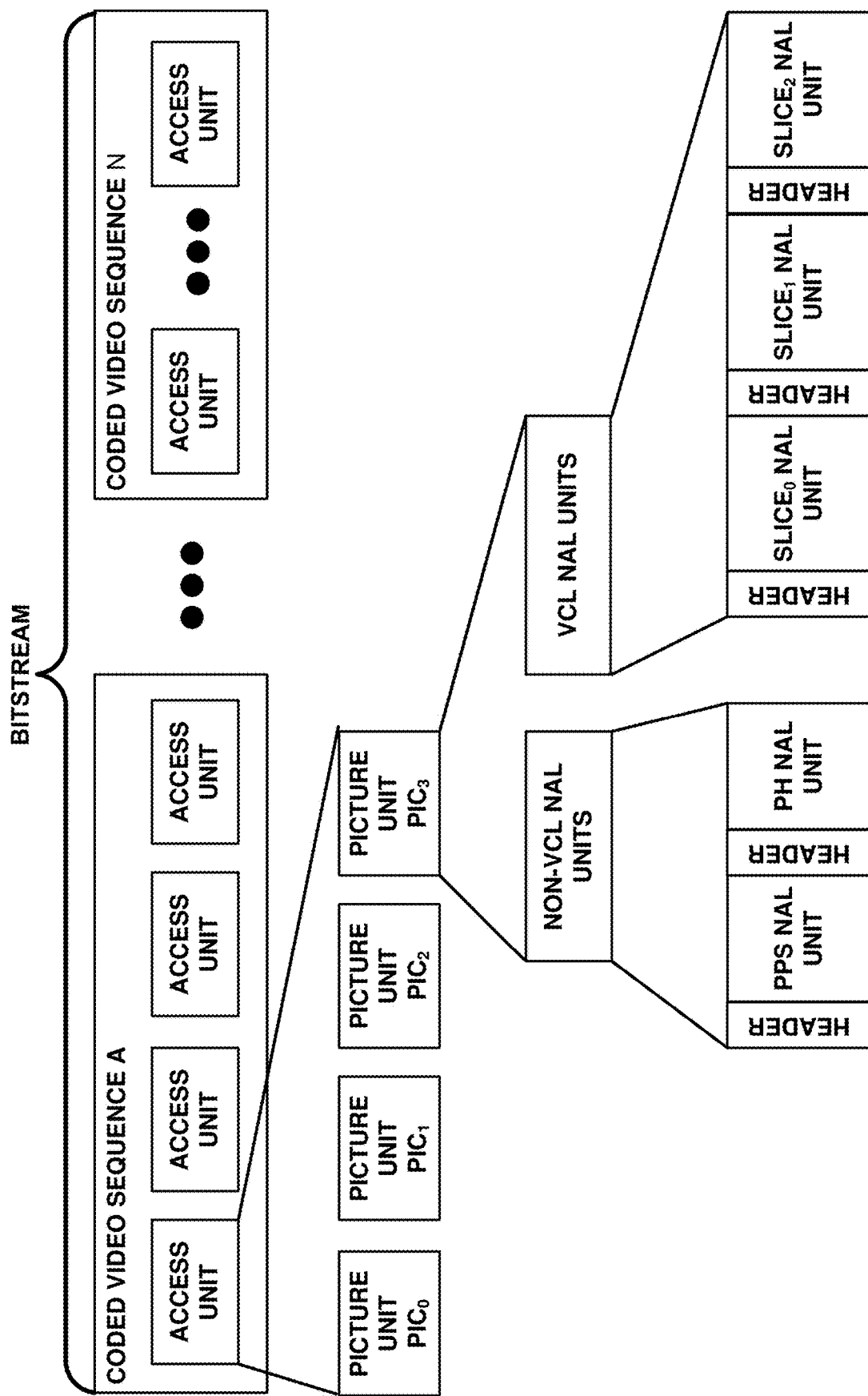
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for $Pic_3$ includes the three VCL NAL coded slice NAL units, i.e., $Slice_0$ NAL unit, $Slice_1$ NAL unit, and $Slice_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units, VPS NAL units, SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. As described in further detail below, in JVET-R2001, a PH syntax structure may be present in the slice header of a VCL NAL unit or in a PH NAL unit of the current PU.

JVET-R2001 defines NAL unit header semantics that specify the type of Raw Byte Sequence Payload (RBSP) data structure included in the NAL unit. Table 1 illustrates the syntax of the NAL unit header provided in JVET-R2001.

TABLE 1

|  | Descriptor |
| --- | --- |
| nal_unit_header( ) { |  |
|    forbidden_zero_bit | f(1) |
|    nuh_reserved_zero_bit | u(1) |
|    nuh_layer_id | u(6) |
|    nal_unit_type | u(5) |
|    nuh_temporal_id_plus1 | u(3) |
| } |  |

JVET-R2001 provides the following definitions for the respective syntax elements illustrated in Table 1.

forbidden_zero_bit shall be equal to 0.

nuh_reserved_zero_bit shall be equal to '0'. The value 1 of nuh_reserved_zero_bit may be specified in the future by ITU-T|ISO/IEC. Decoders shall ignore (i.e. remove from the bitstream and discard) NAL units with nuh_reserved_zero_bit equal to '1'.

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC. The value of nuh_layer_id shall be the same for all VCL NAL units of a coded picture. The value of nuh_layer_id of a coded picture or a PU is the value of the nuh_layer_id of the VCL NAL units of the coded picture or the PU.

When nal_unit_type is equal to PH_NUT, EOS_NUT, or FD_NUT, nuh_layer_id shall be equal to the nuh_layer_id of associated VCL NAL unit.

NOTE—The value of nuh_layer_id of DCI, VPS, AUD, and EOB NAL units is not constrained.

nuh_temporal_id_plus1 minus 1 specifies a temporal identifier for the NAL unit.

The value of nuh_temporal_id_plus1 shall not be equal to 0. The variable TemporalId is derived as follows:

TemporalId=nuh_temporal_id_plus1−1

When nal_unit_type is in the range of IDR_W_RADL to RSV_IRAP_12, inclusive, TemporalId shall be equal to 0. When nal_unit_type is equal to STSA_NUT and vps_independent_layer_flag[GeneralLayerIdx[nuh_layer_id] ] is equal to 1, TemporalId shall not be equal to 0.

The value of TemporalId shall be the same for all VCL NAL units of an AU. The value of TemporalId of a coded picture, a PU, or an AU is the value of the TemporalId of the VCL NAL units of the coded picture, PU, or AU. The value of TemporalId of a sublayer representation is the greatest value of TemporalId of all VCL NAL units in the sublayer representation.

The value of TemporalId for non-VCL NAL units is constrained as follows:
   If nal_unit_type is equal to DCI_NUT, VPS_NUT, or SPS_NUT, TemporalId shall be equal to 0 and the TemporalId of the AU containing the NAL unit shall be equal to 0.

Otherwise, if nal_unit_type is equal to PH_NUT, TemporalId shall be equal to the TemporalId of the PU containing the NAL unit.

Otherwise, if nal_unit_type is equal to EOS_NUT or EOB_NUT, TemporalId shall be equal to 0.

Otherwise, if nal_unit_type is equal to AUD_NUT, FD_NUT, PREFIX_SEI_NUT, or SUFFIX_SEI_NUT, TemporalId shall be equal to the TemporalId of the AU containing the NAL unit.

Otherwise, when nal_unit_type is equal to PPS_NUT, PREFIX_APS_NUT, or SUFFIX_APS_NUT, TemporalId shall be greater than or equal to the TemporalId of the PU containing the NAL unit.

NOTE—When the NAL unit is a non-VCL NAL unit, the value of TemporalId is equal to the minimum value of the TemporalId values of all AUs to which the non-VCL NAL unit applies. When nal_unit_type is equal to PPS_NUT, PREFIX_APS_NUT, or SUFFIX_APS_NUT, TemporalId may be greater than or equal to the TemporalId of the containing AU, as all PPSs and APSs may be included in the beginning of the bitstream (e.g., when they are transported out-of-band, and the receiver places them at the beginning of the bitstream), wherein the first coded picture has TemporalId equal to 0.

nal_unit_type specifies the NAL unit type, i.e., the type of RBSP data structure contained in the NAL unit as specified in Table 2.

The value of nal_unit_type shall be the same for all pictures of a CVSS AU.

NAL units that have nal_unit_type in the range of UNSPEC28 . . . UNSPEC31, inclusive, for which semantics are not specified, shall not affect the decoding process specified in this Specification.

NOTE—NAL unit types in the range of UNSPEC28 . . . UNSPEC31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all NAL units that use reserved values of nal_unit_type.

NOTE—This requirement allows future definition of compatible extensions to this Specification.

TABLE 2

| nal_unit_type | Name of nal_unit_type | Content of NAL unit and RBSP syntax structure | NAL unit type class |
|---|---|---|---|
| 0 | TRAIL_NUT | Coded slice of a trailing picture or subpicture* slice_layer_rbsp( ) | VCL |
| 1 | STSA_NUT | Coded slice of an STSA picture or subpicture* slice_layer_rbsp( ) | VCL |
| 2 | RADL_NUT | Coded slice of a RADL picture or subpicture* slice_layer_rbsp( ) | VCL |
| 3 | RASL_NUT | Coded slice of a RASL picture or subpicture* slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RADL | Coded slice of an IDR picture or subpicture* slice_layer_rbsp( ) | VCL |
| 8 | IDR_N_LP | | |
| 9 | CRA_NUT | Coded slice of a CRA picture or subpicture* slice_layer_rbsp( ) | VCL |
| 10 | GDR_NUT | Coded slice of a GDR picture or subpicture* slice_layer_rbsp( ) | VCL |
| 11 | RSV_IRAP_11 | Reserved IRAP VCL NAL unit types | VCL |
| 12 | RSV_IRAP_12 | | |
| 13 | DCI_NUT | Decoding capability information decoding_capability_information_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

*indicates a property of a picture when pps_mixed_nalu_types_in_pic_flag is equal to 0 and a property of the subpicture when pps_mixed_nalu_types_in_pic_flag is equal to 1.

NOTE—A clean random access (CRA) picture may have associated RASL or RADL pictures present in the bitstream.
NOTE—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.
The value of nal_unit_type shall be the same for all VCL NAL units of a subpicture. A subpicture is referred to as having the same NAL unit type as the VCL NAL units of the subpicture.
When any two subpictures in a picture have different NAL unit types, the value of sps_subpic_treated_as_pic_flag[ ] shall be equal to 1 for all subpictures in the picture that contain at least one P or B slice.
For VCL NAL units of any particular picture, the following applies:
If pps_mixed_nalu_types_in_pic_flag is equal to 0, the value of nal_unit_type shall be the same for all VCL NAL units of a picture, and a picture or a PU is referred to as having the same NAL unit type as the coded slice NAL units of the picture or PU.

Otherwise (pps_mixed_nalu_types_in_pic_flag is equal to 1), the following applies:
The picture shall have at least two subpictures.
VCL NAL units of the picture shall have two or more different nal_unit_type values.
There shall be no VCL NAL unit of the picture that has nal_unit_type_equal to GDR_NUT.
When the VCL NAL units of at least one subpicture of the picture have a particular value of nal_unit_type equal to IDR_W_RADL, IDR_N_LP, or CRA_NUT, the VCL NAL units of other subpictures in the picture shall all have nal_unit_type equal to TRAIL_NUT.
When vps_max_tid_il_ref_pics_plus1 [i][j] is equal to 0 for j equal to GeneralLayerIdx[nuh_layer_id] and any value of i in the range of j+1 to vps_max_layers_minus1, inclusive, the current picture shall not have both VCL NAL units with a particular value of nal_unit_type equal to IDR_W_RADL, IDR_N_LP, or CRA_NUT and VCL NAL units with nal_unit_type equal to a different value than that particular value.
It is a requirement of bitstream conformance that the following constraints apply:

When a picture is a leading picture of an IRAP picture, it shall be a RADL or RASL picture.

When a subpicture is a leading subpicture of an IRAP subpicture, it shall be a RADL or RASL subpicture.

When a picture is not a leading picture of an IRAP picture, it shall not be a RADL or RASL picture.

When a subpicture is not a leading subpicture of an IRAP subpicture, it shall not be a RADL or RASL subpicture.

No RASL pictures shall be present in the bitstream that are associated with an IDR picture.

No RASL subpictures shall be present in the bitstream that are associated with an IDR subpicture.

No RADL pictures shall be present in the bitstream that are associated with an IDR picture having nal_unit_type equal to IDR_N_LP.

NOTE—It is possible to perform random access at the position of an IRAP PU by discarding all PUs before the IRAP PU (and to correctly decode the IRAP picture and all the subsequent non-RASL pictures in decoding order), provided each parameter set is available (either in the bitstream or by external means not specified in this Specification) when it is referenced.

No RADL subpictures shall be present in the bitstream that are associated with an IDR subpicture having nal_unit_type equal to IDR_N_LP.

Any picture, with nuh_layer_id equal to a particular value layerId, that precedes an IRAP picture with nuh_layer_id equal to layerId in decoding order shall precede the IRAP picture in output order and shall precede any RADL picture associated with the IRAP picture in output order.

Any subpicture, with nuh_layer_id equal to a particular value layerId and subpicture index equal to a particular value subpicIdx, that precedes, in decoding order, an IRAP subpicture with nuh_layer_id equal to layerId and subpicture index equal to subpicIdx shall precede, in output order, the IRAP subpicture and all its associated RADL subpictures.

Any picture, with nuh_layer_id equal to a particular value layerId, that precedes a recovery point picture with nuh_layer_id equal to layerId in decoding order shall precede the recovery point picture in output order.

Any subpicture, with nuh_layer_id equal to a particular value layerId and subpicture index equal to a particular value subpicIdx, that precedes, in decoding order, a subpicture with nuh_layer_id equal to layerId and subpicture index equal to subpicIdx in a recovery point picture shall precede that subpicture in the recovery point picture in output order.

Any RASL picture associated with a CRA picture shall precede any RADL picture associated with the CRA picture in output order.

Any RASL subpicture associated with a CRA subpicture shall precede any RADL subpicture associated with the CRA subpicture in output order.

Any RASL picture, with nuh_layer_id equal to a particular value layerId, associated with a CRA picture shall follow, in output order, any IRAP or GDR picture with nuh_layer_id equal to layerId that precedes the CRA picture in decoding order.

Any RASL subpicture, with nuh_layer_id equal to a particular value layerId and subpicture index equal to a particular value subpicIdx, associated with a CRA subpicture shall follow, in output order, any IRAP or GDR subpicture, with nuh_layer_id equal to layerId and subpicture index equal to subpicIdx, that precedes the CRA subpicture in decoding order.

If sps_field_seq_flag is equal to 0 and the current picture, with nuh_layer_id equal to a particular value layerId, is a leading picture associated with an IRAP picture, it shall precede, in decoding order, all non-leading pictures that are associated with the same IRAP picture. Otherwise, let picA and picB be the first and the last leading pictures, in decoding order, associated with an IRAP picture, respectively, there shall be at most one non-leading picture with nuh_layer_id equal to layerId preceding picA in decoding order, and there shall be no non-leading picture with nuh_layer_id equal to layerId between picA and picB in decoding order.

If sps_field_seq_flag is equal to 0 and the current subpicture, with nuh_layer_id equal to a particular value layerId and subpicture index equal to a particular value subpicIdx, is a leading subpicture associated with an IRAP subpicture, it shall precede, in decoding order, all non-leading subpictures that are associated with the same IRAP subpicture. Otherwise, let subpicA and subpicB be the first and the last leading subpictures, in decoding order, associated with an IRAP subpicture, respectively, there shall be at most one non-leading subpicture with nuh_layer_id equal to layerId and subpicture index equal to subpicIdx preceding subpicA in decoding order, and there shall be no non-leading picture with nuh_layer_id equal to layerId and subpicture index equal to subpicIdx between picA and picB in decoding order.

It should be noted that generally, an Intra Random Access Point (IRAP) picture is a picture that does not refer to any pictures other than itself for prediction in its decoding process. In JVET-R2001, an IRAP picture may be a clean random access (CRA) picture or an instantaneous decoder refresh (IDR) picture. In JVET-R2001, the first picture in the bitstream in decoding order must be an IRAP or a gradual decoding refresh (GDR) picture. JVET-R2001 describes the concept of a leading picture, which is a picture that precedes the associated IRAP picture in output order. JVET-R2001 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. JVET-R2001 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. The other type of picture that can follow an IRAP picture in decoding order and precede it in output order is the random access decodable leading (RADL) picture, which cannot contain references to any pictures that precede the IRAP picture in decoding order. A GDR picture, is a picture for which each VCL NAL unit has nal_unit_type equal to GDR_NUT. If the current picture is a GDR picture that is associated with a picture header which signals a syntax element recovery_poc_cnt and there is a picture picA that follows the current GDR picture in decoding order in the CLVS and that has PicOrderCntVal equal to the PicOrderCntVal of the current GDR picture plus the value of recovery_poc_cnt, the picture picA is referred to as the recovery point picture.

As provided in Table 2, a NAL unit may include a sequence parameter set (SPS) syntax structure. Table 3 illustrates the syntax structure of the video parameter set provided in JVET-R2001.

TABLE 3

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   sps_gdr_enabled_flag | u(1) |
|   sps_chroma_format_idc | u(2) |
|   sps_ref_pic_resampling_enabled_flag | u(1) |
|   if( sps_ref_pic_resampling_enabled_flag ) | |
|     sps_res_change_in_clvs_allowed_flag | u(1) |
|   sps_pic_width_max_in_luma_samples | ue(v) |
|   sps_pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   sps_subpic_info_present_flag | u(1) |
|   if( sps_subpic_info_present_flag ) { | |
|     sps_num_subpics_minus1 | ue(v) |
|     if( sps_num_subpics_minus1 > 0 ) | |
|       sps_independent_subpics_flag | u(1) |
|     for( i = 0; sps_num_subpics_minus1 > 0 && i <= sps_num_subpics_minus1; i++ ) { | |
|       if( i > 0 && sps_pic_width_max_in_luma_samples > CtbSizeY ) | |
|         sps_subpic_ctu_top_left_x[ i ] | u(v) |
|       if( i > 0 && sps_pic_height_max_in_luma_samples > CtbSizeY ) { | |
|         sps_subpic_ctu_top_left_y[ i ] | u(v) |
|       if( i < sps_num_subpics_minus1 && | |
|         sps_pic_width_max_in_luma_samples > CtbSizeY ) | |
|         sps_subpic_width_minus1[ i ] | u(v) |
|       if( i < sps_num_subpics_minus1 && | |
|         sps_pic_height_max_in_luma_samples > CtbSizeY ) | |
|         sps_subpic_height_minus1[ i ] | u(v) |
|       if( !sps_independent_subpics_flag) { | |
|         sps_subpic_treated_as_pic_flag[ i ] | u(1) |
|         sps_loop_filter_across_subpic_enabled_flag[ i ] | u(1) |
|       } | |
|     } | |
|     sps_subpic_id_len_minus1 | ue(v) |
|     sps_subpic_id_mapping_explicitly_signalled_flag | u(1) |
|     if( sps_subpic_id_mapping_explicitly_signalled_flag ) { | |
|       sps_subpic_id_mapping_present_flag | u(1) |
|       if( sps_subpic_id_mapping_present_flag ) | |
|         for( i = 0; i <= sps_num_subpics_minus1; i++ ) | |
|           sps_subpic_id[ i ] | u(v) |
|     } | |
|   } | |
|   sps_bit_depth_minus8 | ue(v) |
|   sps_entropy_coding_sync_enabled_flag | u(1) |
|   sps_entry_point_offsets_present_flag | u(1) |
|   sps_log2_max_pic_order_cnt_lsb_minus4 | u(4) |
|   sps_poc_msb_cycle_flag | u(1) |
|   if( sps_poc_msb_cycle_flag ) | |
|     sps_poc_msb_cycle_len_minus1 | ue(v) |
|   sps_num_extra_ph_bits_bytes | u(2) |
|   extra_ph_bits_struct( sps_num_extra_ph_bits_bytes ) | |
|   sps_num_extra_sh_bits_bytes | u(2) |
|   extra_sh_bits_struct( sps_num_extra_sh_bits_bytes ) | |
|   if( sps_ptl_dpb_hrd_params_present_flag ) { | |
|     if( sps_max_sublayers_minus1 > 0 ) | |
|       sps_sublayer_dpb_params_flag | u(1) |
|     dpb_parameters( sps_max_sublayers_minus1, sps_sublayer_dpb_params_flag ) | |
|   } | |
|   if( ChromaArrayType != 0 ) | |
|     sps_qtbtt_dual_tree_intra_flag | u(1) |
|   sps_log2_min_luma_coding_block_size_minus2 | ue(v) |
|   sps_partition_constraints_override_enabled_flag | u(1) |

TABLE 3-continued

| | Descriptor |
|---|---|
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( sps_qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| } | |
| if( CtbSizeY > 32 ) | |
|   sps_max_luma_transform_size_64_flag | u(1) |
| if( ChromaArrayType != 0 ) { | |
|   sps_joint_cbcr_enabled_flag | u(1) |
|   sps_same_qp_table_for_chroma_flag | u(1) |
|   numQpTables = sps_same_qp_table_for_chroma_flag ? 1 : | |
|     ( sps_joint_cbcr_enabled_flag ? 3 : 2 ) | |
|   for( i = 0; i < numQpTables; i++ ) { | |
|     sps_qp_table_start_minus26[ i ] | se(v) |
|     sps_num_points_in_qp_table_minus1[ i ] | ue(v) |
|     for( j = 0; j <= sps_num_points_in_qp_table_minus1[ i ]; j++ ) { | |
|       sps_delta_qp_in_val_minus1[ i ][ j ] | ue(v) |
|       sps_delta_qp_diff_val[ i ][ j ] | ue(v) |
|     } | |
|   } | |
| } | |
| sps_sao_enabled_flag | u(1) |
| sps_alf_enabled_flag | u(1) |
| if( sps_alf_enabled_flag && ChromaArrayType != 0 ) | |
|   sps_ccalf_enabled_flag | u(1) |
| sps_transform_skip_enabled_flag | u(1) |
| if( sps_transform_skip_enabled_flag ) { | |
|   sps_log2_transform_skip_max_size_minus2 | ue(v) |
|   sps_bdpcm_enabled_flag | u(1) |
| } | |
| sps_weighted_pred_flag | u(1) |
| sps_weighted_bipred_flag | u(1) |
| sps_long_term_ref_pics_flag | u(1) |
| if( sps_video_parameter_set_id > 0 ) | |
|   sps_inter_layer_ref_pics_present_flag | u(1) |
| sps_idr_rpl_present_flag | u(1) |
| sps_rpl1_same_as_rpl0_flag | u(1) |
| for( i = 0; i < sps_rpl1_same_as_rpl0_flag ? 1 : 2; i++ ) { | |
|   sps_num_ref_pic_lists[ i ] | ue(v) |
|   for( j = 0; j < sps_num_ref_pic_lists[ i ]; j++) | |
|     ref_pic_list_struct( i, j ) | |
| } | |
| sps_ref_wraparound_enabled_flag | u(1) |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| if( sps_bdof_enabled_flag ) | |
|   sps_bdof_control_present_in_ph_flag | u(1) |
| sps_smvd_enabled_flag | u(1) |
| sps_dmvr_enabled_flag | u(1) |
| if( sps_dmvr_enabled_flag ) | |
|   sps_dmvr_control_present_in_ph_flag | u(1) |
| sps_mmvd_enabled_flag | u(1) |
| if( sps_mmvd_enabled_flag ) | |
|   sps_mmvd_fullpel_only_flag | u(1) |
| sps_six_minus_max_num_merge_cand | ue(v) |

TABLE 3-continued

| | Descriptor |
|---|---|
| sps_sbt_enabled_flag | u(1) |
| sps_affine_enabled_flag | u(1) |
| if( sps_affine_enabled_flag ) { | |
|   sps_five_minus_max_num_subblock_merge_cand | ue(v) |
|   sps_affine_type_flag | u(1) |
|   if( sps_amvr_enabled_flag ) | |
|     sps_affine_amvr_enabled_flag | u(1) |
|   sps_affine_prof_enabled_flag | u(1) |
|   if( sps_affine_prof_enabled_flag ) | |
|     sps_prof_control_present_in_ph_flag | u(1) |
| } | |
| sps_bcw_enabled_flag | u(1) |
| sps_ciip_enabled_flag | u(1) |
| if( MaxNumMergeCand >= 2 ) { | |
|   sps_gpm_enabled_flag | u(1) |
|   if( sps_gpm_enabled_flag && MaxNumMergeCand >= 3 ) | |
|     sps_max_num_merge_cand_minus_max_num_gpm_cand | ue(v) |
| } | |
| sps_log2_parallel_merge_level_minus2 | ue(v) |
| sps_isp_enabled_flag | u(1) |
| sps_mrl_enabled_flag | u(1) |
| sps_mip_enabled_flag | u(1) |
| if( ChromaArrayType != 0 ) | |
|   sps_cclm_enabled_flag | u(1) |
| if( sps_chroma_format_idc == 1 ) { | |
|   sps_chroma_horizontal_collocated_flag | u(1) |
|   sps_chroma_vertical_collocated_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_palette_enabled_flag | u(1) |
| if( ChromaArrayType == 3 && !sps_max_luma_transform_size_64_flag ) | |
|   sps_act_enabled_flag | u(1) |
| if( sps_transform_skip_enabled_flag || sps_palette_enabled_flag ) | |
|   sps_internal_bit_depth_minus_input_bit_depth | ue(v) |
| sps_ibc_enabled_flag | u(1) |
| if( sps_ibc_enabled_flag ) | |
|   sps_six_minus_max_num_ibc_merge_cand | ue(v) |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |
| sps_explicit_scaling_list_enabled_flag | u(1) |
| if( sps_lfnst_enabled_flag && sps_explicit_scaling_list_enabled_flag ) | |
|   sps_scaling_matrix_for_lfnst_disabled_flag | u(1) |
| if( sps_act_enabled_flag && sps_explicit_scaling_list_enabled_flag ) | |
|   sps_scaling_matrix_for_alternative_colour_space_disabled_flag | u(1) |
| if( sps_scaling_matrix_for_alternative_colour_space_disabled_flag ) | |
|   sps_scaling_matrix_designated_colour_space_flag | u(1) |
| sps_dep_quant_enabled_flag | u(1) |
| if( !sps_dep_quant_enabled_flag ) | |
|   sps_sign_data_hiding_enabled_flag | u(1) |
| sps_virtual_boundaries_enabled_flag | u(1) |
| if( sps_virtual_boundaries_enabled_flag ) { | |
|   sps_virtual_boundaries_present_flag | u(1) |
|   if( sps_virtual_boundaries_present_flag ) { | |
|     sps_num_ver_virtual_boundaries | u(2) |
|     for( i = 0; i < sps_num_ver_virtual_boundaries; i++ ) | |
|       sps_virtual_boundary_pos_x[ i ] | ue(v) |
|     sps_num_hor_virtual_boundaries | u(2) |
|     for( i = 0; i < sps_num_hor_virtual_boundaries; i++ ) | |
|       sps_virtual_boundary_pos_y[ i ] | ue(v) |
|   } | |
| } | |
| if( sps_ptl_dpb_hrd_params_present_flag ) { | |
|   sps_general_hrd_params_present_flag | u(1) |
|   if( sps_general_hrd_params_present_flag ) { | |
|     general_hrd_parameters( ) | |

TABLE 3-continued

| | Descriptor |
|---|---|
|       if( sps_max_sublayers_minus1 > 0 ) | |
|          sps_sublayer_cpb_params_present_flag | u(1) |
|       firstSubLayer = sps_sublayer_cpb_params_present_flag ? 0 : | |
|          sps_max_sublayers_minus1 | |
|       ols_hrd_parameters( firstSubLayer, sps_max_sublayers_minus1 ) | |
|     } | |
|   } | |
| sps_field_seq_flag | u(1) |
| sps_vui_parameters_present_flag | u(1) |
| if( sps_vui_parameters_present_flag ) | |
|   vui_parameters( ) /* Specified in ITU-T H.SEI \| ISO/IEC 23002-7 */ | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

With respect to Table 3, JVET-R2001 provides the following semantics:

An SPS RBSP shall be available to the decoding process prior to it being referenced, included in at least one AU with TemporalId equal to 0 or provided through external means. All SPS NAL units with a particular value of sps_seq_parameter_set_id in a CVS shall have the same content.

sps_seq_parameter_set_id provides an identifier for the SPS for reference by other syntax elements.

SPS NAL units, regardless of the nuh_layer_id values, share the same value space of sps_seq_parameter_set_id.

Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and all OLSs specified by the VPS that contain the layer with nuh_layer_id equal to vclLayerId also contain the layer with nuh_layer_id equal to spslayerId.

sps_video_parameter_set_id, when greater than 0, specifies the value of vps_video_parameter_set_id for the VPS referred to by the SPS.

When sps_video_parameter_set_id is equal to 0, the following applies:

The SPS does not refer to a VPS, and no VPS is referred to when decoding each CLVS referring to the SPS.

The value of vps_max_layers_minus1 is inferred to be equal to 0.

The value of vps_max_sublayers_minus1 is inferred to be equal to 6.

The CVS shall contain only one layer (i.e., all VCL NAL unit in the CVS shall have the same value of nuh_layer_id).

The value of GeneralLayerIdx[nuh_layer_id] is inferred to be equal to 0.

The value of vps_independent_layer_flag[GeneralLayerIdx[nuh_layer_id] ] is inferred to be equal to 1.

When vps_independent_layer_flag[GeneralLayerIdx[nuh_layer_id] ] is equal to 1, the SPS referred to by a CLVS with a particular nuh_layer_id value nuhLayerId shall have nuh_layer_id equal to nuhLayerId.

The value of sps_video_parameter_set_id shall be the same in all SPSs that are referred to by CLVSs in a CVS.

sps_max_sublayers_minus1 plus 1 specifies the maximum number of temporal sublayers that may be present in each CLVS referring to the SPS. The value of sps_max_sublayers_minus1 shall be in the range of 0 to vps_max_sublayers_minus1, inclusive.

sps_reserved_zero_4 bits shall be equal to 0 in bitstreams conforming to this version of this Specification. Other values for sps_reserved_zero_4 bits are reserved for future use by ITU-T|ISO/IEC.

sps_ptl_dpb_hrd_params_present_flag equal to 1 specifies that a profile_tier_level( ) syntax structure and a dpb_parameters( ) syntax structure are present in the SPS, and a general_hrd_parameters( ) syntax structure and an o ls_hrd_parameters( ) syntax structure may also be present in the SPS. sps_ptl_dpb_hrd_params_present_flag equal to 0 specifies that none of these four syntax structures is present in the SPS.

When sps_video_parameter_set_id is greater than 0 and there is an OLS that contains only one layer with nuh_layer_id equal to the nuh_layer_id of the SPS, or when sps_video_parameter_set_id is equal to 0, the value of sps_ptl_dpb_hrd_params_present_flag shall be equal to 1.

sps_gdr_enabled_flag equal to 1 specifies that GDR pictures are enabled and may be present in CLVS. sps_gdr_enabled_flag equal to 0 specifies that GDR pictures are disabled and not present in CLVS.

sps_chroma_format_idc specifies the chroma sampling relative to the luma sampling as specified.

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_chroma_format_idc shall be less than or equal to the value of vps_ols_dpb_chroma_format[i].

sps_separate_colour_plane_flag equal to 1 specifies that the three colour components of the 4:4:4 chroma format are coded separately. sps_separate_colour_plane_flag equal to 0 specifies that the colour components are not coded separately. When sps_separate_colour_plane_flag is not present, it is inferred to be equal to 0. When sps_separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific sh_colour_plane_id value.

NOTE—There is no dependency in decoding processes between the colour planes having different sh_colour_plane_id values. For example, the decoding process of a monochrome picture with one value of sh_colour_plane_id does not use any data from monochrome pictures having different values of sh_colour_plane_id for inter prediction.

Depending on the value of sps_separate_colour_plane_flag, the value of the variable ChromaArrayType is assigned as follows:

If sps_separate_colour_plane_flag is equal to 0, ChromaArrayType is set equal to sps_chroma_format_idc.

Otherwise (sps_separate_colour_plane_flag is equal to 1), ChromaArrayType is set equal to 0.

sps_ref_pic_resampling_enabled_flag equal to 1 specifies that reference picture resampling is enabled and one or more slices of pictures in the CLVS may refer to a reference picture with a different spatial resolution in an active entry of a reference picture list. sps_ref_pic_resampling_enabled_flag equal to 0 specifies that reference picture resampling is disabled and no slice of pictures in the CLVS refers to a reference picture with a different spatial resolution in an active entry of a reference picture list.

NOTE—When sps_ref_pic_resampling_enabled_flag is equal to 1, for a current picture the reference picture with a different spatial resolution may either belong to the same layer or a different layer than the layer containing the current picture.

sps_res_change_in_clvs_allowed_flag equal to 1 specifies that the picture spatial resolution may change within a CLVS referring to the SPS. sps_res_change_in_clvs_allowed_flag equal to 0 specifies that the picture spatial resolution does not change within any CLVS referring to the SPS. When not present, the value of sps_res_change_in_clvs_allowed_flag is inferred to be equal to 0.

sps_pic_width_max_in_luma_samples specifies the maximum width, in units of luma samples, of each decoded picture referring to the SPS. sps_pic_width_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_width_max_in_luma_samples shall be less than or equal to the value of vps_ols_dpb_pic_width[i].

sps_pic_height_max_in_luma_samples specifies the maximum height, in units of luma samples, of each decoded picture referring to the SPS. sps_pic_height_max_in_luma_samples shall not be equal to 0 and shall be an integer multiple of Max(8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_height_max_in_luma_samples shall be less than or equal to the value of vps_ols_dpb_pic_height[i].

sps_conformance_window_flag equal to 1 indicates that the conformance cropping window offset parameters follow next in the SPS. sps_conformance_window_flag equal to 0 indicates that the conformance cropping window offset parameters are not present in the SPS.

sps_conf_win_left_offset, sps_conf_win_right_offset, sps_conf_win_top_offset, and sps_conf_win_bottom_offset specify the cropping window that is applied to pictures with pps_pic_width_in_luma_samples equal to sps_pic_width_max_in_luma_samples and pps_pic_height_in_luma_samples equal to sps_pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.

The conformance cropping window contains the luma samples with horizontal picture coordinates from SubWidthC*sps_conf_win_left_offset to sps_pic_width_max_in_luma_samples−(SubWidthC*sps_conf_win_right_offset+1) and vertical picture coordinates from SubHeightC*sps_conf_win_top_offset to sps_pic_height_max_in_luma_samples−(SubHeightC*sps_conf_win_bottom_offset+1), inclusive.

The value of SubWidthC*(sps_conf_win_left_offset+sps_conf_win_right_offset) shall be less than sps_pic_width_max_in_luma_samples, and the value of SubHeightC*(sps_conf_win_top_offset+sps_conf_win_bottom_offset) shall be less than sps_pic_height_max_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

sps_log 2_ctu_size_minus5 plus 5 specifies the luma coding tree block size of each CTU. The value of sps_log 2_ctu_size_minus5 shall be in the range of 0 to 2, inclusive. The value 3 for sps_log 2_ctu_size_minus5 is reserved for future use by ITU-T I ISO/IEC.

The variables CtbLog2SizeY and CtbSizeY are derived as follows:

CtbLog2SizeY=sps_log 2_ctu_size_minus5+5

CtbSizeY=1<<CtbLog2SizeY sps_subpic_info_present_flag equal to 1 specifies that subpicture information is present for the CLVS and there may be one or more than one subpicture in each picture of the CLVS. sps_subpic_info_present_flag equal to 0 specifies that subpicture information is not present for the CLVS and there is only one subpicture in each picture of the CLVS. When sps_res_change_in_clvs_allowed_flag is equal to 1, the value of sps_subpic_info_present_flag shall be equal to 0.

NOTE—When a bitstream is the result of a sub-bitstream extraction process and contains only a subset of the subpictures of the input bitstream to the sub-bitstream extraction process, it might be required to set the value of sps_subpic_info_present_flag equal to 1 in the RBSP of the SPSs.

sps_num_subpics_minus1 plus 1 specifies the number of subpictures in each picture in the CLVS. The value of sps_num_subpics_minus1 shall be in the range of 0 to Ceil(sps_pic_width_max_in_luma_samples CtbSizeY)* Ceil(sps_pic_height_max_in_luma_samples CtbSizeY)−1, inclusive. When not present, the value of sps_num_subpics_minus1 is inferred to be equal to 0.

sps_independent_subpics_flag equal to 1 specifies that all subpicture boundaries in the CLVS are treated as picture boundaries and there is no loop filtering across the subpicture boundaries. sps_independent_subpics_flag equal to 0 does not impose such a constraint. When not present, the value of sps_independent_subpics_flag is inferred to be equal to 1.

sps_subpic_ctu_top_left_x[i] specifies horizontal position of top left CTU of i-th subpicture in unit of CtbSizeY. The length of the syntax element is Ceil(Log2((sps_pic_width_max_in_luma_samples+CtbSizeY−1)>>CtbLog2SizeY)) bits. When not present, the value of sps_subpic_ctu_top_left_x[i] is inferred to be equal to 0.
sps_subpic_ctu_top_left_y[i] specifies vertical position of top left CTU of i-th subpicture in unit of CtbSizeY. The length of the syntax element is Ceil(Log2((sps_pic_height_max_in_luma_samples+CtbSizeY−1)>>CtbLog2SizeY)) bits. When not present, the value of sps_subpic_ctu_top_left_y[i] is inferred to be equal to 0.
sps_subpic_width_minus1[i] plus 1 specifies the width of the i-th subpicture in units of CtbSizeY. The length of the syntax element is Ceil(Log2((sps_pic_width_max_in_luma_samples+CtbSizeY−1)>>CtbLog2SizeY)) bits. When not present, the value of sps_subpic_width_minus1[i] is inferred to be equal to ((sps_pic_width_max_in_luma_samples+CtbSizeY−1)>>CtbLog2SizeY)−sps_subpic_ctu_top_left_x[i]−1.
sps_subpic_height_minus1[i] plus 1 specifies the height of the i-th subpicture in units of CtbSizeY. The length of the syntax element is Ceil(Log2((sps_pic_height_max_in_luma_samples+CtbSizeY−1)>>CtbLog2SizeY)) bits. When not present, the value of sps_subpic_height_minus1[i] is inferred to be equal to ((sps_pic_height_max_in_luma_samples+CtbSizeY−1)>>CtbLog2SizeY)− sps_subpic_ctu_top_left_y[i]−1.
It is a requirement of bitstream conformance that the shapes of the subpictures shall be such that each subpicture, when decoded, shall have its entire left boundary and entire top boundary consisting of picture boundaries or consisting of boundaries of previously decoded subpictures.
For each subpicture with subpicture index i in the range of 0 to sps_num_subpics_minus1, inclusive, it is a requirement of bitstream conformance that all of the following conditions are true:
  The value of (sps_subpic_ctu_top_left_x[i]*CtbSizeY) shall be less than (sps_pic_width_max_in_luma_samples−sps_conf_win_right_offset*SubWidthC).
  The value of ((sps_subpic_ctu_top_left_x[i]+sps_subpic_width_minus1 [i]+1)*CtbSizeY) shall be greater than (sps_conf_win_left_offset*SubWidthC).
  The value of (sps_subpic_ctu_top_left_y[i]*CtbSizeY) shall be less than (sps_pic_height_max_in_luma_samples−sps_conf_win_bottom_offset*SubHeightC).
  The value of ((sps_subpic_ctu_top_left_y[i]+sps_subpic_height_minus1 [i]+1)*CtbSizeY) shall be greater than (sps_conf_win_top_offset*SubHeightC).
sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operations. When not present, the value of sps_subpic_treated_as_pic_flag[i] is inferred to be equal to 1.
When sps_num_subpics_minus1 is greater than 0 and sps_subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:
  For each AU in targetAuSet, all pictures of the layers in targetLayerSet shall have the same value of pps_pic_width_in_luma_samples and the same value of pps_pic_height_in_luma_samples.
  All the SPSs referred to by the layers in targetLayerSet shall have the same value of sps_num_subpics_minus1 and shall have the same values of sps_subpic_ctu_top_left_x[j], sps_subpic_ctu_top_left_y [j], sps_subpic_width_minus1 [j], sps_subpic_height_minus1 [j], and sps_subpic_treated_as_pic_flag [j], respectively, for each value of j in the range of 0 to sps_num_subpics_minus1, inclusive.
  For each AU in targetAuSet, all pictures of the layers in targetLayerSet shall have the same value of SubpicIdVal[j] for each value of j in the range of 0 to sps_num_subpics_minus1, inclusive.
sps_loop_filter_across_subpic_enabled_flag[i] equal to 1 specifies that in-loop filtering operations across subpicture boundaries is enabled and may be performed across the boundaries of the i-th subpicture in each coded picture in the CLVS. sps_loop_filter_across_subpic_enabled_flag[i] equal to 0 specifies that in-loop filtering operations across subpicture boundaries is disabled and are not performed across the boundaries of the i-th subpicture in each coded picture in the CLVS. When not present, the value of sps_loop_filter_across_subpic_enabled_pic_flag[i] is inferred to be equal to 0.
sps_subpic_id_len_minus1 plus 1 specifies the number of bits used to represent the syntax element sps_subpic_id[i], the syntax elements pps_subpic_id[i], when present, and the syntax element sh_subpic_id, when present. The value of sps_subpic_id_len_minus1 shall be in the range of 0 to 15, inclusive. The value of 1<<(sps_subpic_id_len_minus1+1) shall be greater than or equal to sps_num_subpics_minus1+1.
sps_subpic_id_mapping_explicitly_signalled_flag equal to 1 specifies that the subpicture ID mapping is explicitly signalled, either in the SPS or in the PPSs referred to by coded pictures of the CLVS. sps_subpic_id_mapping_explicitly_signalled_flag equal to 0 specifies that the subpicture ID mapping is not explicitly signalled for the CLVS. When not present, the value of sps_subpic_id_mapping_explicitly_signalled_flag is inferred to be equal to 0.
sps_subpic_id_mapping_present_flag equal to 1 specifies that the subpicture ID mapping is signalled in the SPS when sps_subpic_id_mapping_explicitly_signalled_flag is equal to 1. sps_subpic_id_mapping_present_flag equal to 0 specifies that subpicture ID mapping is signalled in the PPSs referred to by coded pictures of the CLVS when sps_subpic_id_mapping_explicitly_signalled_flag is equal to 1.
sps_subpic_id[i] specifies the subpicture ID of the i-th subpicture. The length of the sps_subpic_id[i] syntax element is sps_subpic_id_len_minus1+1 bits.
sps_bit_depth_minus8 specifies the bit depth of the samples of the luma and chroma arrays, BitDepth, and the value of the luma and chroma quantization parameter range offset, QpBdOffset, as follows:

$$BitDepth=8+sps\_bit\_depth\_minus8$$

$$QpBdOffset=6*sps\_bit\_depth\_minus8$$

sps_bit_depth_minus8 shall be in the range of 0 to 8, inclusive.
When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_bit_depth_minus8 shall be less than or equal to the value of vps_ols_dpb_bitdepth_minus8[i].

sps_entropy_coding_sync_enabled_flag equal to 1 specifies that a specific synchronization process for context variables is invoked before decoding the CTU that includes the first CTB of a row of CTBs in each tile in each picture referring to the SPS, and a specific storage process for context variables is invoked after decoding the CTU that includes the first CTB of a row of CTBs in each tile in each picture referring to the SPS. sps_entropy_coding_sync_enabled_flag equal to 0 specifies that no specific synchronization process for context variables is required to be invoked before decoding the CTU that includes the first CTB of a row of CTBs in each tile in each picture referring to the SPS, and no specific storage process for context variables is required to be invoked after decoding the CTU that includes the first CTB of a row of CTBs in each tile in each picture referring to the SPS.

> NOTE—When sps_entropy_coding_sync_enabled_flag is equal to 1, the so-called wavefront parallel processing (WPP) is enabled.

sps_entry_point_offsets_present_flag equal to 1 specifies that signalling for entry point offsets for tiles or tile-specific CTU rows may be present in the slice headers of pictures referring to the SPS. sps_entry_point_offsets_present_flag equal to 0 specifies that signalling for entry point offsets for tiles or tile-specific CTU rows are not present in the slice headers of pictures referring to the SPS.

sps_log 2_max_pic_order_cnt_lsb_minus4 specifies the value of the variable MaxPicOrderCntLsb that is used in the decoding process for picture order count as follows:

$$MaxPicOrderCntLsb = 2^{(sps\_log2\_max\_pic\_order\_cnt\_lsb\_minus4+4)}$$

The value of sps_log 2_max_pic_order_cnt_lsb_minus4 shall be in the range of 0 to 12, inclusive.

sps_poc_msb_cycle_flag equal to 1 specifies that the ph_poc_msb_cycle_present_flag syntax element is present in PHs referring to the SPS. sps_poc_msb_cycle_flag equal to 0 specifies that the ph_poc_msb_cycle_present_flag syntax element is not present in PHs referring to the SPS.

sps_poc_msb_cycle_len_minus1 plus 1 specifies the length, in bits, of the ph_poc_msb_cycle_val syntax elements, when present in the PHs referring to the SPS. The value of sps_poc_msb_cycle_len_minus1 shall be in the range of 0 to 32−sps_log 2_max_pic_order_cnt_lsb_minus4−5, inclusive.

sps_num_extra_ph_bits_bytes specifies the number of bytes of extra bits in the PH syntax structure for coded pictures referring to the SPS. The value of sps_num_extra_ph_bits_bytes shall be equal to 0 in bitstreams conforming to this version of this Specification. Although the value of sps_num_extra_ph_bits_bytes is required to be equal to 0 in this version of this Specification, decoder conforming to this version of this Specification shall allow the value of sps_num_extra_ph_bits_bytes equal to 1 or 2 to appear in the syntax.

sps_num_extra_sh_bits_bytes specifies the number of bytes of extra bits in the slice headers for coded pictures referring to the SPS. The value of sps_num_extra_sh_bits_bytes shall be equal to 0 in bitstreams conforming to this version of this Specification. Although the value of sps_num_extra_sh_bits_bytes is required to be equal to 0 in this version of this Specification, decoder conforming to this version of this Specification shall allow the value of sps_num_extra_sh_bits_bytes equal to 1 or 2 to appear in the syntax.

sps_sublayer_dpb_params_flag is used to control the presence of max_dec_pic_buffering_minus1 [i], max_num_reorder_pics[i], and max_latency_increase_plus1 [i] syntax elements in the dpb_parameters( ) syntax strucure in the SPS. When not present, the value of sps_sub_dpb_params_info_present_flag is inferred to be equal to 0.

sps_qtbtt_dual_tree_intra_flag equal to 1 specifies that, for I slices, each CTU is split into coding units with 64×64 luma samples using an implicit quadtree split, and these coding units are the root of two separate coding_tree syntax structure for luma and chroma. sps_qtbtt_dual_tree_intra_flag equal to 0 specifies separate coding_tree syntax structure is not used for I slices. When sps_qtbtt_dual_tree_intra_flag is not present, it is inferred to be equal to 0.

sps_log 2_min_luma_coding_block_size_minus2 plus 2 specifies the minimum luma coding block size. The value range of sps_log 2_min_luma_coding_block_size_minus2 shall be in the range of 0 to Min(4, sps_log 2_ctu_size_minus5+3), inclusive.

The variables MinCbLog2SizeY, MinCbSizeY, IbcBufWidthY, IbcBufWidthC and Vsize are derived as follows:

MinCbLog2SizeY=sps_log 2_min_luma_coding_block_size_minus2+2

MinCbSizeY=1<<MinCbLog2SizeY

IbcBufWidthY=256*128/CtbSizeY

IbcBufWidthC=IbcBufWidthY/SubWidthC

VSize=Min(64,CtbSizeY)

The value of MinCbSizeY shall less than or equal to VSize. The variables CtbWidthC and CtbHeightC, which specify the width and height, respectively, of the array for each chroma CTB, are derived as follows:

If sps_chroma_format_idc is equal to 0 (monochrome) or sps_separate_colour_plane_flag is equal to 1, CtbWidthC and CtbHeightC are both equal to 0.

Otherwise, CtbWidthC and CtbHeightC are derived as follows:

CtbWidthC=CtbSizeY/SubWidthC

CtbHeightC=CtbSizeY/SubHeightC

For log 2BlockWidth ranging from 0 to 4 and for log 2BlockHeight ranging from 0 to 4, inclusive, the up-right diagonal scan order array initialization process as specified is invoked with 1<<log 2BlockWidth and 1<<log 2BlockHeight as inputs, and the output is assigned to DiagScanOrder[log 2BlockWidth][log 2BlockHeight].

For log 2BlockWidth ranging from 0 to 6 and for log 2BlockHeight ranging from 0 to 6, inclusive, the horizontal and vertical traverse scan order array initialization process as specified is invoked with 1<<log 2BlockWidth and 1<<log 2BlockHeight as inputs, and the output is assigned to HorTravScanOrder[log 2BlockWidth][log 2BlockHeight] and VerTravScanOrder[log 2BlockWidth][log 2BlockHeight].

sps_partition_constraints_override_enabled_flag equal to 1 specifies the presence of ph_partition_constraints_override_flag in PHs referring to the SPS. sps_partition_constraints_override_enabled_flag equal to 0 specifies the absence of ph_partition_constraints_override_flag in PHs referring to the SPS.

sps_log 2_diff_min_qt_min_cb_intra_slice_luma specifies the default difference between the base 2 logarithm of the minimum size in luma samples of a luma leaf block resulting from quadtree splitting of a CTU and the base 2 logarithm of the minimum coding block size in luma samples for luma CUs in slices with sh_slice_type equal to 2 (I) referring to the SPS. When sps_partition_constraints_override_enabled_flag is equal to 1, the default difference can be overridden by ph_log 2_diff_min_qt_min_cb_luma present in PHs referring to the SPS. The value of sps_log 2_diff_min_qt_min_cb_intra_slice_luma shall be in the range of 0 to Min(6, CtbLog2SizeY)− MinCbLog2SizeY, inclusive. The base 2 logarithm of the minimum size in luma samples of a luma leaf block resulting from quadtree splitting of a CTU is derived as follows:

MinQtLog2SizeIntraY=sps_log 2_diff_min_qt_min_cb_intra_slice_luma+MinCbLog2SizeY sps_max_mtt_hierarchy_depth_intra_slice_luma specifies the default maximum hierarchy depth for coding units resulting from multi-type tree splitting of a quadtree leaf in slices with sh_slice_type equal to 2 (I) referring to the SPS. When sps_partition_constraints_override_enabled_flag is equal to 1, the default maximum hierarchy depth can be overridden by ph_max_mtt_hierarchy_depth_intra_slice_luma present in PHs referring to the SPS. The value of sps_max_mtt_hierarchy_depth_intra_slice_luma shall be in the range of 0 to 2*(CtbLog2SizeY−MinCbLog2SizeY), inclusive.

sps_log 2_diff_max_bt_min_qt_intra_slice_luma specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with sh_slice_type equal to 2 (I) referring to the SPS. When sps_partition_constraints_override_enabled_flag is equal to 1, the default difference can be overridden by ph_log 2_diff_max_bt_min_qt_luma present in PHs referring to the SPS. The value of sps_log 2_diff_max_bt_min_qt_intra_slice_luma shall be in the range of 0 to (sps_qtbtt_dual_tree_intra_flag? Min(6, CtbLog2SizeY): CtbLog2SizeY)−MinQtLog2SizeIntraY, inclusive. When sps_log 2_diff_max_bt_min_qt_intra_slice_luma is not present, the value of sps_log 2_diff_max_bt_min_qt_intra_slice_luma is inferred to be equal to 0.

sps_log 2_diff_max_tt_min_qt_intra_slice_luma specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with sh_slice_type equal to 2 (I) referring to the SPS. When sps_partition_constraints_override_enabled_flag is equal to 1, the default difference can be overridden by ph_log 2_diff_max_tt_min_qt_luma present in PHs referring to the SPS. The value of sps_log 2_diff_max_tt_min_qt_intra_slice_luma shall be in the range of 0 to Min(6, CtbLog2SizeY)− MinQtLog2SizeIntraY, inclusive. When sps_log 2_diff_max_tt_min_qt_intra_slice_luma is not present, the value of sps_log 2_diff_max_tt_min_qt_intra_slice_luma is inferred to be equal to 0.

sps_log 2_diff_min_qt_min_cb_inter_slice specifies the default difference between the base 2 logarithm of the minimum size in luma samples of a luma leaf block resulting from quadtree splitting of a CTU and the base 2 logarithm of the minimum luma coding block size in luma samples for luma CUs in slices with sh_slice_type equal to 0 (B) or 1 (P) referring to the SPS. When sps_partition_constraints_override_enabled_flag is equal to 1, the default difference can be overridden by ph_log 2_diff_min_qt_min_cb_luma present in PHs referring to the SPS. The value of sps_log 2_diff_min_qt_min_cb_inter_slice shall be in the range of 0 to Min(6, CtbLog2SizeY)−MinCbLog2SizeY, inclusive. The base 2 logarithm of the minimum size in luma samples of a luma leaf block resulting from quadtree splitting of a CTU is derived as follows:

MinQtLog2SizeInterY=sps_log 2_diff_min_qt_min_cb_inter_slice+MinCbLog2SizeY sps_max_mtt_hierarchy_depth_inter_slice specifies the default maximum hierarchy depth for coding units resulting from multi-type tree splitting of a quadtree leaf in slices with sh_slice_type equal to 0 (B) or 1 (P) referring to the SPS. When sps_partition_constraints_override_enabled_flag is equal to 1, the default maximum hierarchy depth can be overridden by ph_max_mtt_hierarchy_depth_inter_slice present in PHs referring to the SPS. The value of sps_max_mtt_hierarchy_depth_inter_slice shall be in the range of 0 to 2*(CtbLog2SizeY−MinCbLog2SizeY), inclusive.

sps_log 2_diff_max_bt_min_qt_inter_slice specifies the default difference between the base 2 logarithm of the maximum size (width or height) in luma samples of a luma coding block that can be split using a binary split and the minimum size (width or height) in luma samples of a luma leaf block resulting from quadtree splitting of a CTU in slices with sh_slice_type equal to 0 (B) or 1 (P) referring to the SPS. When sps_partition_constraints_override_enabled_flag is equal to 1, the default difference can be overridden by ph_log 2_diff_max_bt_min_qt_luma present in PHs referring to the SPS. The value of sps_log 2_diff_max_bt_min_qt_inter_slice shall be in the range of 0 to CtbLog2SizeY−MinQtLog2SizeInterY, inclusive. When sps_log 2_diff_max_bt_min_qt_inter_slice is not present, the value of sps_log 2_diff_max_bt_min_qt_inter_slice is inferred to be equal to 0.

sps_log 2_diff_max_tt_min_qt_inter_slice specifies the default difference between the base 2 logarithm of the maximum size (width or height) in luma samples of a luma coding block that can be split using a ternary split and the minimum size (width or height) in luma samples of a luma leaf block resulting from quadtree splitting of a CTU in slices with sh_slice_type equal to 0 (B) or 1 (P) referring to the SPS. When sps_partition_constraints_override_enabled_flag is equal to 1, the default difference can be overridden by ph_log 2_diff_max_tt_min_qt_luma present in PHs referring to the SPS. The value of sps_log 2_diff_max_tt_min_qt_inter_slice shall be in the range of 0 to Min(6, CtbLog2SizeY)−MinQtLog2SizeInterY, inclusive. When sps_log 2_diff_max_tt_min_qt_inter_slice is not present, the value of sps_log 2_diff_max_tt_min_qt_inter_slice is inferred to be equal to 0.

sps_log 2_diff_min_qt_min_cb_intra_slice_chroma specifies the default difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in slices with sh_slice_type equal to 2 (I) referring to the SPS. When sps_partition_constraints_override_enabled_flag is equal to 1, the default difference can be overridden by ph_log 2_diff_min_qt_min_cb_chroma present in PHs referring to the SPS. The value of sps_log 2_diff_min_qt_min_cb_intra_slice_chroma shall be in the range of 0 to Min(6, CtbLog2SizeY)— MinCbLog2SizeY, inclusive. When not present, the value of sps_log 2_diff_min_qt_min_cb_intra_slice_chroma is inferred to be equal to 0. The base 2 logarithm of the minimum size in luma samples of a chroma leaf block resulting from quadtree splitting of a CTU with treeType equal to DUAL_TREE_CHROMA is derived as follows:

MinQtLog2SizeIntraC=sps_log 2_diff_min_qt_min_cb_intra_slice_chroma+MinCbLog2SizeY sps_max_mtt_hierarchy_depth_intra_slice_chroma specifies the default maximum hierarchy depth for chroma coding units resulting from multi-type tree splitting of a chroma quadtree leaf with treeType equal to DUAL_TREE_CHROMA in slices with sh_slice_type equal to 2 (I) referring to the SPS. When sps_partition_constraints_override_enabled_flag is equal to 1, the default maximum hierarchy depth can be overridden by ph_max_mtt_hierarchy_depth_chroma present in PHs referring to the SPS. The value of sps_max_mtt_hierarchy_depth_intra_slice_chroma shall be in the range of 0 to 2*(CtbLog2SizeY−MinCbLog2SizeY), inclusive. When not present, the value of sps_max_mtt_hierarchy_depth_intra_slice_chroma is inferred to be equal to 0.

sps_log 2_diff_max_bt_min_qt_intra_slice_chroma specifies the default difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in slices with sh_slice_type equal to 2 (I) referring to the SPS. When sps_partition_constraints_override_enabled_flag is equal to 1, the default difference can be overridden by ph_log 2_diff_max_bt_min_qt_chroma present in PHs referring to the SPS. The value of sps_log 2_diff_max_bt_min_qt_intra_slice_chroma shall be in the range of 0 to Min(6, CtbLog2SizeY)— MinQtLog2SizeIntraC, inclusive. When sps_log 2_diff_max_bt_min_qt_intra_slice_chroma is not present, the value of sps_log 2_diff_max_bt_min_qt_intra_slice_chroma is inferred to be equal to 0.

sps_log 2_diff_max_tt_min_qt_intra_slice_chroma specifies the default difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in slices with sh_slice_type equal to 2 (I) referring to the SPS. When sps_partition_constraints_override_enabled_flag is equal to 1, the default difference can be overridden by ph_log 2_diff_max_tt_min_qt_chroma present in PHs referring to the SPS. The value of sps_log 2_diff_max_tt_min_qt_intra_slice_chroma shall be in the range of 0 to Min(6, CtbLog2SizeY)−MinQtLog2SizeIntraC, inclusive. When sps_log 2_diff_max_tt_min_qt_intra_slice_chroma is not present, the value of sps_log 2_diff_max_tt_min_qt_intra_slice_chroma is inferred to be equal to 0.

sps_max_luma_transform_size_64_flag equal to 1 specifies that the maximum transform size in luma samples is equal to 64. sps_max_luma_transform_size_64_flag equal to 0 specifies that the maximum transform size in luma samples is equal to 32. When not present, the value of sps_max_luma_transform_size_64_flag is inferred to be equal to 0.

The variables MinTbLog2SizeY, MaxTbLog2SizeY, MinTbSizeY, and MaxTbSizeY are derived as follows:

MinTbLog2SizeY=2

MaxTbLog2SizeY=sps_max_luma_transform_size_64_flag?6: 5

MinTbSizeY=1<<MinTbLog2SizeY

MaxTbSizeY=1<<MaxTbLog2SizeY sps_joint_cbcr_enabled_flag equal to 0 specifies that the joint coding of chroma residuals is disabled and not used in decoding of pictures in the CLVS. sps_joint_cbcr_enabled_flag equal to 1 specifies that the joint coding of chroma residuals is enabled and may be used in decoding of pictures in the CLVS. When not present, the value of sps_joint_cbcr_enabled_flag is inferred to be equal to 0.

sps_same_qp_table_for_chroma_flag equal to 1 specifies that only one chroma QP mapping table is signalled and this table applies to Cb and Cr residuals and additionally to joint Cb-Cr residuals when sps_joint_cbcr_enabled_flag is equal to 1. sps_same_qp_table_for_chroma_flag equal to 0 specifies that chroma QP mapping tables, two for Cb and Cr, and one additional for joint Cb-Cr when sps_joint_cbcr_enabled_flag is equal to 1, are signalled in the SPS. When not present, the value of sps_same_qp_table_for_chroma_flag is inferred to be equal to 1.

sps_qp_table_start_minus26[i] plus 26 specifies the starting luma and chroma QP used to describe the i-th chroma QP mapping table. The value of sps_qp_table_start_minus26[i] shall be in the range of −26−QpBdOffset to 36 inclusive. When not present, the value of sps_qp_table_start_minus26[i] is inferred to be equal to 0.

sps_num_points_in_qp_table_minus1 [i] plus 1 specifies the number of points used to describe the i-th chroma QP mapping table. The value of sps_num_points_in_qp_table_minus1 [i] shall be in the range of 0 to 63+QpBdOffset, inclusive. When not present, the value of sps_num_points_in_qp_table_minus1 [0] is inferred to be equal to 0.

sps_delta_qp_in_val_minus1[i][j] specifies a delta value used to derive the input coordinate of the j-th pivot point of the i-th chroma QP mapping table. When not present, the value of sps_delta_qp_in_val_minus1[0][j] is inferred to be equal to 0.

sps_delta_qp_diff_val[i][j] specifies a delta value used to derive the output coordinate of the j-th pivot point of the i-th chroma QP mapping table.

The i-th chroma QP mapping table ChromaQpTable[I] for I=0 . . . numQpTables−1 is derived as follows:

```
qpInVal[ i ][ 0 ] = sps_qp_table_start_minus26[ i ] + 26
qpOutVal[ i ][ 0 ] = qpInVal[ i ][ 0 ]
for( j = 0; j <= sps_num_points_in_qp_table_minus1[ i ]; j++ ) {
    qpInVal[ i ][ j + 1 ] = qpInVal[ i ][ j ] + sps_delta_qp_in_val_minus1[ i ][ j ] + 1
```

```
  qpOutVal[ i ][ j + 1 ] = qpOutVal[ i ][ j ] +
    ( sps_delta_qp_in_val_minus1[ i ][ j ] ^ sps_delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
  ChromaQpTable[ i ][ k ] = Clip3( −QpBdOffset, 63, ChromaQpTable[ i ][ k + 1 ] − 1 )
for( j = 0; j <= sps_num_points_in_qp_table_minus1[ i ]; j++ ) {
  sh = ( sps_delta_qp_in_val_minus1[ i ][j ] + 1 ) >> 1
  for( k = qpInVal[ i ][ j ] + 1, m = 1; k <= qpInval[ i ][ j + 1 ]; k++, m++ )
    ChromaQpTable[ i ][ k ] = ChromaQpTable[ i ][ qpInVal[ i ][ j ] ] +
      ( ( qpOutVal[ i ][j + 1] − qpOutVal[ i ][j ] ) * m + sh ) /
( sps_delta_qp_in_val_minus1[ i ][ j ] + 1 )
}
for( k = qpInVal[ i ][ sps_num_points_in_qp_table_minus1[ i ] + 1 ] + 1; k <= 63; k++ )
  ChromaQpTable[ i ][ k ] = Clip3( −QpBdOffset, 63, ChromaQpTable[ i ][ k − 1 ] + 1 )
```

When sps_same_qp_table_for_chroma_flag is equal to 1, ChromaQpTable[1][k] and ChromaQpTable[2][k] are set equal to ChromaQpTable[0][k] for kin the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to sps_num_points_in_qp_table_minus1[i]+1, inclusive.

sps_sao_enabled_flag equal to 1 specifies that the sample adaptive offset process is enabled and may be applied to the reconstructed picture after the deblocking filter process for the CLVS. sps_sao_enabled_flag equal to 0 specifies that the sample adaptive offset process is disabled and not applied to the reconstructed picture after the deblocking filter process for the CLVS.

sps_alf_enabled_flag equal to 0 specifies that the adaptive loop filter is disabled and not applied in decoding of pictures in the CLVS. sps_alf_enabled_flag equal to 1 specifies that the adaptive loop filter is enabled and may be applied in decoding of pictures in the CLVS.

sps_ccalf_enabled_flag equal to 0 specifies that the cross-component adaptive loop filter is disabled and not applied in decoding of pictures in the CLVS. sps_ccalf_enabled_flag equal to 1 specifies that the cross-component adaptive loop filter is enabled and may be applied in decoding of pictures in the CLVS. When not present, the value of sps_ccalf_enabled_flag is inferred to be equal to 0.

sps_transform_skip_enabled_flag equa to 1 specifies that transform_skip_flag may be present in the transform unit syntax. sps_transform_skip_enabled_flag equal to 0 specifies that transform_skip_flag is not present in the transform unit syntax.

sps_log 2_transform_skip_max_size_minus2 specifies the maximum block size used for transform skip, and shall be in the range of 0 to 3, inclusive.

The variable MaxTsSize is set equal to 1<<(sps_log 2_transform_skip_max_size_minus2+2). sps_bdpcm_enabled_flag equal to 1 specifies that intra_bdpcm_luma_flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.

sps_weighted_pred_flag equal to 1 specifies that weighted prediction may be applied to P slices referring to the SPS. sps_weighted_pred_flag equal to 0 specifies that weighted prediction is not applied to P slices referring to the SPS.

sps_weighted_bipred_flag equal to 1 specifies that explicit weighted prediction may be applied to B slices referring to the SPS. sps_weighted_bipred_flag equal to 0 specifies that explicit weighted prediction is not applied to B slices referring to the SPS.

sps_long_term_ref_pics_flag equal to 0 specifies that no LTRP is used for inter prediction of any coded picture in the CLVS. sps_long_term_ref_pics_flag equal to 1 specifies that LTRPs may be used for inter prediction of one or more coded pictures in the CLVS.

sps_inter_layer_ref_pics_present_flag equal to 0 specifies that no ILRP is used for inter prediction of any coded picture in the CLVS. sps_inter_layer_ref_pics_present_flag equal to 1 specifies that ILRPs may be used for inter prediction of one or more coded pictures in the CLVS. When sps_video_parameter_set_id is equal to 0, the value of sps_inter_layer_ref_pics_present_flag is inferred to be equal to 0. When vps_independent_layer_flag[GeneralLayerIdx [nuh_layer_id] ] is equal to 1, the value of sps_inter_layer_ref_pics_present_flag shall be equal to 0.

sps_idr_rpl_present_flag equal to 1 specifies that reference picture list syntax elements are present in slice headers of IDR pictures. sps_idr_rpl_present_flag equal to 0 specifies that reference picture list syntax elements are not present in slice headers of IDR pictures.

sps_rpl1_same_as_rpl0_flag equal to 1 specifies that the syntax element sps_num_ref_pic_lists[1] and the syntax structure ref_pic_list_struct(1, rplsIdx) are not present and the following applies:
  The value of sps_num_ref_pic_lists[1] is inferred to be equal to the value of sps_num_ref_pic_lists[0].
  The value of each of syntax elements in ref_pic_list_struct(1, rplsIdx) is inferred to be equal to the value of corresponding syntax element in ref_pic_list_struct(0, rplsIdx) for rplsIdx ranging from 0 to sps_num_ref_pic_lists[0]−1.

sps_num_ref_pic_lists[i] specifies the number of the ref_pic_list_struct(listIdx, rplsIdx) syntax structures with listIdx equal to i included in the SPS. The value of sps_num_ref_pic_lists[i] shall be in the range of 0 to 64, inclusive.
  NOTE—For each value of listIdx (equal to 0 or 1), a decoder should allocate memory for a total number of sps_num_ref_pic_lists[i]+1 ref_pic_list_struct(listIdx, rplsIdx) syntax structures since there may be one ref_pic_list_struct(listIdx, rplsIdx) syntax structure directly signalled in the slice headers of a current picture.

sps_ref_wraparound_enabled_flag equal to 1 specifies that horizontal wrap-around motion compensation is enabled and may be applied in inter prediction when decoding pictures in the CLVS. sps_ref_wraparound_enabled_flag equal to 0 specifies that horizontal wrap-around motion compensation is disabled and not applied in inter prediction when decoding pictures in the CLVS.

It is a requirement of bitstream conformance that, when there is one or more values of i in the range of 0 to sps_num_subpics_minus1, inclusive, for which sps_subpic_treated_as_pic_flag[i] is equal to 1 and sps_subpic_width_minus1 [i] plus 1 is not equal to (sps_pic_width_max_in_luma_samples+CtbSizeY−1)>> CtbLog2SizeY), the value of sps_ref_wraparound_enabled_flag shall be equal to 0.

sps_temporal_mvp_enabled_flag equal to 1 specifies that temporal motion vector predictors are enabled and may be used in decoding of pictures in the CLVS. sps_temporal_mvp_enabled_flag equal to 0 specifies that temporal motion vector predictors are disabled and not used in decoding of pictures in the CLVS.

sps_sbtmvp_enabled_flag equal to 1 specifies that subblock-based temporal motion vector predictors are enabled and may be used in decoding of pictures with all slices having sh_slice_type not equal to I in the CLVS. sps_sbtmvp_enabled_flag equal to 0 specifies that subblock-based temporal motion vector predictors are disabled and not used in decoding of pictures in the CLVS. When sps_sbtmvp_enabled_flag is not present, it is inferred to be equal to 0.

sps_amvr_enabled_flag equal to 1 specifies that adaptive motion vector difference resolution is enabled and may be used in motion vector coding in decoding of pictures in the CVLS. amvr_enabled_flag equal to 0 specifies that adaptive motion vector difference resolution is disabled and not used in motion vector coding in decoding of pictures in the CLVS.

sps_bdof_enabled_flag equal to 0 specifies that the bi-directional optical flow inter prediction is disabled and not used in decoding of pictures in the CLVS. sps_bdof_enabled_flag equal to 1 specifies that the bi-directional optical flow inter prediction is enabled and may be used in decoding of pictures in the CLVS.

sps_bdof_control_present_in_ph_flag equal to 1 specifies that ph_bdof_disabled_flag is present in PHs referring to the SPS. sps_bdof_control_present_in_ph_flag equal to 0 specifies that ph_bdof_disabled_flag is not present in PHs referring to the SPS. When sps_bdof_control_present_in_ph_flag is not present, the value of sps_bdof_control_present_in_ph_flag is inferred to be equal to 0.

sps_smvd_enabled_flag equal to 1 specifies that symmetric motion vector difference is enabled may be used in motion vector decoding in decoding of pictures in the CLVS. sps_smvd_enabled_flag equal to 0 specifies that symmetric motion vector difference is disabled and not used in motion vector coding in decoding of pictures in the CLVS.

sps_dmvr_enabled_flag equal to 1 specifies that decoder motion vector refinement based inter bi-prediction is enabled and may be used in decoding of pictures in the CLVS. sps_dmvr_enabled_flag equal to 0 specifies that decoder motion vector refinement based inter bi-prediction is disabled and not used in decoding of pictures in the CLVS.

sps_dmvr_control_present_in_ph_flag equal to 1 specifies that ph_dmvr_disabled_flag is present in PHs referring to the SPS. sps_dmvr_control_present_in_ph_flag equal to 0 specifies that ph_dmvr_disabled_flag is not present in PHs referring to the SPS. When sps_dmvr_control_present_in_ph_flag is not present, the value of sps_dmvr_control_present_in_ph_flag is inferred to be equal to 0.

sps_mmvd_enabled_flag equal to 1 specifies that merge mode with motion vector difference is enabled and may be used in decoding of pictures in the CLVS. sps_mmvd_enabled_flag equal to 0 specifies that merge mode with motion vector difference is disabled and not used in in decoding of pictures in the CLVS.

sps_six_minus_max_num_merge_cand specifies the maximum number of merging motion vector prediction (MVP) candidates supported in the SPS subtracted from 6. The value of sps_six_minus_max_num_merge_cand shall be in the range of 0 to 5, inclusive.

The maximum number of merging MVP candidates, MaxNumMergeCand, is derived as follows:

$$MaxNumMergeCand = 6 - sps\_six\_minus\_max\_num\_merge\_cand$$

sps_sbt_enabled_flag equal to 0 specifies that subblock transform for inter-predicted CUs is disabled and not used in decoding of pictures in the CLVS. sps_sbt_enabled_flag equal to 1 specifies that subblock transform for inter-predicteds CU is enabled and may be used in decoding of pictures in the CLVS.

sps_affine_enabled_flag equal to 0 specifies that affine model based motion compensation is disabled and not used in decoding of pictures in the CLVS and inter_affine_flag and cu_affine_type_flag are not present in the coding unit syntax of the CLVS. sps_affine_enabled_flag equal to 1 specifies that affine model based motion compensation is enabled and may be used in decoding of pictures in the CLVS and inter_affine_flag and cu_affine_type_flag may be present in the coding unit syntax of the CLVS.

sps_five_minus_max_num_subblock_merge_cand specifies the maximum number of subblock-based merging motion vector prediction candidates supported in the SPS subtracted from 5. The value of sps_five_minus_max_num_subblock_merge_cand shall be in the range of 0 to 5−sps_sbtmvp_enabled_flag, inclusive.

sps_affine_type_flag specifies whether 6-parameter affine model based motion compensation can be used for inter prediction. If sps_affine_type_flag is equal to 0, the syntax shall be constrained such that no 6-parameter affine model based motion compensation is used in the CLVS, and cu_affine_type_flag is not present in coding unit syntax in the CLVS. Otherwise (sps_affine_type_flag is equal to 1), 6-parameter affine model based motion compensation can be used in the CLVS. When not present, the value of sps_affine_type_flag is inferred to be equal to 0.

sps_affine_amvr_enabled_flag equal to 1 specifies that adaptive motion vector difference resolution is enabled and may be used in motion vector coding of affine inter mode in decoding of pictures in the CLVS. sps_affine_amvr_enabled_flag equal to 0 specifies that adaptive motion vector difference resolution is disabled and not used in motion vector coding of affine inter mode in decoding of pictures in the CLVS. When not present, the value of sps_affine_amvr_enabled_flag is inferred to be equal to 0.

sps_affine_prof_enabled_flag equal to 0 specifies that the affine motion compensation refined with optical flow is disabled and not used in decoding of pictures in the CLVS. sps_affine_prof_enabled_flag equal to 1 specifies that the affine motion compensation refined with optical flow is enabled and may be used in decoding of pictures in the CLVS. When not present, the value of sps_affine_prof_enabled_flag is inferred to be equal to 0.

sps_prof_control_present_in_ph_flag equal to 1 specifies that ph_prof_disabled_flag is present in PHs referring to the SPS. sps_prof_control_present_in_ph_flag equal to 0 specifies that ph_prof_disabled_flag is not present in PHs referring to the SPS. When sps_prof_control_present_in_ph_flag is not present, the value of sps_prof_control_present_in_ph_flag is inferred to be equal to 0.

sps_bcw_enabled_flag equal to 0 specifies that bi-prediction with CU weights is disabled and not used in decoding of pictures in the CLVS and bcw_idx is not present in the coding unit syntax of the CLVS. sps_bcw_enabled_flag equal to 1 specifies that bi-prediction with CU weights is enabled and may be used in decoding of pictures in the CLVS and bcw_idx may be present in the coding unit syntax of the CLVS.

sps_ciip_enabled_flag specifies that ciip_flag may be present in the coding unit syntax for inter coding units. sps_ciip_enabled_flag equal to 0 specifies that ciip_flag is not present in the coding unit syntax for inter coding units.

sps_mmvd_fullpel_only_flag equal to 1 specifies that merge mode with motion vector difference uses integer sample precision. sps_mmvd_fullpel_only_flag equal to 0 specifies that merge mode with motion vector difference may use fractional sample precision. When not present, the value of sps_mmvd_fullpel_only_flag is inferred to be equal to 0.

sps_gpm_enabled_flag equal to 0 specifies that geometric partition based motion compensation is disabled and not used in decoding of picturs in the CLVS and merge_gpm_partition_idx, merge_gpm_idx0, and merge_gpm_idx1 are not present in the coding unit syntax of the CLVS. sps_gpm_enabled_flag equal to 1 specifies that geometric partition based motion compensation is enabled and may be used in decoding of pictures in the CLVS and merge_gpm_partition_idx, merge_gpm_idx0, and merge_gpm_idx1 may be present in the coding unit syntax of the CLVS. When not present, the value of sps_gpm_enabled_flag is inferred to be equal to 0.

sps_max_num_merge_cand_minus_max_num_gpm_cand specifies the maximum number of geometric partitioning merge mode candidates supported in the SPS subtracted from MaxNumMergeCand. The value of sps_max_num_merge_cand_minus_max_num_gpm_cand shall be in the range of 0 to MaxNumMergeCand−2, inclusive.

The maximum number of geometric partitioning merge mode candidates, MaxNumGpmMergeCand, is derived as follows:

```
if( sps_gpm_enabled_flag && MaxNumMergeCand >= 3 )
   MaxNumGpmMergeCand = MaxNumMergeCand -
      sps_max_num_merge_cand_minus_max_num_gpm_cand
else if( sps_gpm_enabled_flag && MaxNumMergeCand = = 2 )
   MaxNumGpmMergeCand = 2
else
   MaxNumGpmMergeCand = 0
``` sps_log 2_parallel_merge_level_minus2 plus 2 specifies the value of the variable Log2ParMrgLevel, which is used in the derivation process for spatial merging candidates as specified, the derivation process for motion vectors and reference indices in subblock merge mode as specified, and to control the invocation of the updating process for the history-based motion vector predictor list. The value of sps_log 2_parallel_merge_level_minus2 shall be in the range of 0 to CtbLog2SizeY−2, inclusive. The variable Log2ParMrgLevel is derived as follows:

Log2ParMrgLevel=sps_log 2_parallel_merge_level_minus2+2 sps_isp_enabled_flag equal to 1 specifies that intra prediction with subpartitions is enabled and may be used in decoding of pictures in the CLVS. sps_isp_enabled_flag equal to 0 specifies that intra prediction with subpartitions is disabled and not used in decoding of pictures in the CLVS.

sps_mrl_enabled_flag equal to 1 specifies that intra prediction with multiple reference lines is enabled and may be used in decoding of pictures in the CLVS. sps_mrl_enabled_flag equal to 0 specifies that intra prediction with multiple reference lines is disabled and not used in decoding of pictures in the CLVS.

sps_mip_enabled_flag equal to 1 specifies that matrix-based intra prediction is enabled and may be used in decoding of pictures in the CLVS. sps_mip_enabled_flag equal to 0 specifies that matrix-based intra prediction is disabled and not used in decoding of pictures in the CLVS.

sps_cclm_enabled_flag equal to 0 specifies that the cross-component linear model intra prediction from luma component to chroma component is disabled and not used in decoding of pictures in the CLVS. sps_cclm_enabled_flag equal to 1 specifies that the cross-component linear model intra prediction from luma component to chroma component is enabled and may be used in decoding of pictures in the CLVS. When sps_cclm_enabled_flag is not present, it is inferred to be equal to 0.

sps_chroma_horizontal_collocated_flag equal to 1 specifies that prediction processes operate in a manner designed for chroma sample positions that are not horizontally shifted relative to corresponding luma sample positions. sps_chroma_horizontal_collocated_flag equal to 0 specifies that prediction processes operate in a manner designed for chroma sample positions that are shifted to the right by 0.5 in units of luma samples relative to corresponding luma sample positions. When sps_chroma_horizontal_collocated_flag is not present, it is inferred to be equal to 1.

sps_chroma_vertical_collocated_flag equal to 1 specifies that prediction processes operate in a manner designed for chroma sample positions that are not vertically shifted relative to corresponding luma sample positions. sps_chroma_vertical_collocated_flag equal to 0 specifies that prediction processes operate in a manner designed for chroma sample positions that are shifted downward by 0.5 in units of luma samples relative to corresponding luma sample positions. When sps_chroma_vertical_collocated_flag is not present, it is inferred to be equal to 1.

sps_mts_enabled_flag equal to 1 specifies that sps_explicit_mts_intra_enabled_flag and sps_explicit_mts_inter_enabled_flag are present in the SPS. sps_mts_enabled_flag equal to 0 specifies that sps_explicit_mts_intra_enabled_flag and sps_explicit_mts_inter_enabled_flag are not present in the SPS.

sps_explicit_mts_intra_enabled_flag equal to 1 specifies that mts_idx may be present in the intra coding unit syntax of the CLVS. sps_explicit_mts_intra_enabled_flag equal to 0 specifies that mts_idx is not present in the intra coding unit syntax of the CLVS. When not present, the value of sps_explicit_mts_intra_enabled_flag is inferred to be equal to 0.

sps_explicit_mts_inter_enabled_flag equal to 1 specifies that mts_idx may be present in the inter coding unit syntax of the CLVS. sps_explicit_mts_inter_enabled_flag equal to 0 specifies that mts_idx is not present in the inter coding unit syntax of the CLVS. When not present, the value of sps_explicit_mts_inter_enabled_flag is inferred to be equal to 0.

sps_palette_enabled_flag equal to 1 specifies that pred_mode_plt_flag may be present in the coding unit syntax of the CLVS. sps_palette_enabled_flag equal to 0 specifies that pred_mode_plt_flag is not present in the coding unit syntax of the CLVS. When sps_palette_enabled_flag is not present, it is inferred to be equal to 0.
sps_act_enabled_flag equal to 1 specifies that adaptive colour transform is enabled and may be used in decoding of pictures in the CLVS and the cu_act_enabled_flag may be present in the coding unit syntax of the CLVS. sps_act_enabled_flag equal to 0 specifies that adaptive colour transform is disabled and not used in decoding of pictures in the CLVS and cu_act_enabled_flag is not present in the coding unit syntax of the CLVS. When sps_act_enabled_flag is not present, it is inferred to be equal to 0.
sps_internal_bit_depth_minus_input_bit_depth specifies the minimum allowed quantization parameter for transform skip mode as follows:

QpPrimeTsMin=4+6*sps_internal_bit_depth_minus_input_bit_depth

The value of sps_internal_bit_depth_minus_input_bit_depth shall be in the range of 0 to 8, inclusive.
sps_ibc_enabled_flag equal to 1 specifies that the IBC prediction mode is enabled and may be used in decoding of pictures in the CLVS. sps_ibc_enabled_flag equal to 0 specifies that the IBC prediction mode is disabled and not used in decoding of pictures in the CLVS. When sps_ibc_enabled_flag is not present, it is inferred to be equal to 0.
sps_six_minus_max_num_ibc_merge_cand, when sps_ibc_enabled_flag is equal to 1, specifies the maximum number of IBC merging block vector prediction (BVP) candidates supported in the SPS subtracted from 6. The value of sps_six_minus_max_num_ibc_merge_cand shall be in the range of 0 to 5, inclusive.
The maximum number of IBC merging BVP candidates, MaxNumIbcMergeCand, is derived as follows:

```
if( sps_ibc_enabled_flag )
    MaxNumIbcMergeCand = 6 −
        sps_six_minus_max_num_ibc_merge_cand
else
    MaxNumIbcMergeCand = 0
``` sps_lmcs_enabled_flag equal to 1 specifies that luma mapping with chroma scaling is enabled and may be used in decoding of pictures in the CLVS. sps_lmcs_enabled_flag equal to 0 specifies that luma mapping with chroma scaling is disabled and not used in decoding of pictures in the CLVS.
sps_lfnst_enabled_flag equal to 1 specifies that lfnst_idx may be present in intra coding unit syntax. sps_lfnst_enabled_flag equal to 0 specifies that lfnst_idx is not present in intra coding unit syntax.
sps_ladf_enabled_flag equal to 1 specifies that sps_num_ladf_intervals_minus2, sps_ladf_lowest_interval_qp_offset, sps_ladf_qp_offset[i], and sps_ladf_delta_threshold_minus1[i] are present in the SPS. sps_ladf_enabled_flag equal to 0 specifies that sps_num_ladf_intervals_minus2, sps_ladf_lowest_interval_qp_offset, sps_ladf_qp_offset[i], and sps_ladf_delta_threshold_minus1[i] are not present in the SPS.
sps_num_ladf_intervals_minus2 plus 2 specifies the number of sps_ladf_delta_threshold_minus1 [i] and sps_ladf_qp_offset[i] syntax elements that are present in the SPS. The value of sps_num_ladf_intervals_minus2 shall be in the range of 0 to 3, inclusive.
sps_ladf_lowest_interval_qp_offset specifies the offset used to derive the variable qP as specified. The value of sps_ladf_lowest_interval_qp_offset shall be in the range of −63 to 63, inclusive.
sps_ladf_qp_offset[i] specifies the offset array used to derive the variable qP as specified. The value of sps_ladf_qp_offset [i] shall be in the range of −63 to 63, inclusive.
sps_ladf_delta_threshold_minus1[i] is used to compute the values of SpsLadfIntervalLowerBound[i], which specifies the lower bound of the i-th luma intensity level interval. The value of sps_ladf_delta_threshold_minus1 [i] shall be in the range of 0 to $2^{BitDepth}-3$, inclusive.
The value of SpsLadfIntervalLowerBound[0] is set equal to 0.
For each value of i in the range of 0 to sps_num_ladf_intervals_minus2, inclusive, the variable SpsLadfIntervalLowerBound[i+1] is derived as follows:

SpsLadfIntervalLowerBound[i+1]=SpsLadfIntervalLowerBound[i]+sps_ladf_delta_threshold_minus1[i]+1 sps_explicit_scaling_list_enabled_flag equal to 1 specifies that the use of an explicit scaling list, which is signalled in a scaling list APS, in the scaling process for transform coefficients when decoding a slice is enabled for the CLVS. sps_explicit_scaling_list_enabled_flag equal to 0 specifies that the use of an explicit scaling list in the scaling process for transform coefficients when decoding a slice is disabled for the CLVS.
sps_scaling_matrix_for_lfnst_disabled_flag equal to 1 specifies that scaling matrices are disabled and not applied to blocks coded with LFNST for the CLVS. sps_scaling_matrix_for_lfnst_disabled_flag equal to 0 specifies that the scaling matrices is enabled and may be applied to blocks coded with LFNST for the CLVS. When not present, the value of sps_scaling_matrix_for_lfnst_disabled_flag is inferred to be equal to 1.
sps_scaling_matrix_for_alternative_colour_space_disabled_flag equal to 1 specifies that for the CLVS scaling matrices are disabled and not applied to blocks when the colour space of the blocks is not equal to the designated colour space of scaling matrix. sps_scaling_matrix_for_alternative_colour_space_disabled_flag equal to 0 specifies that for the CLVS scaling matrices are enabled and may be applied to the blocks when the colour space of the blocks is equal to the designated colour space of scaling matrices. When not present, the value of sps_scaling_matrix_for_alternative_colour_sapce_disabled_flag is inferred to be equal to 0.
sps_scaling_matrix_designated_colour_space_flag equal to 1 specifies that the designated colour space of scaling matrices is the original colour space. sps_scaling_matrix_designated_colour_space_flag equal to 0 specifies that the designated colour space of scaling matrices is the transformed colour space. When not present, the value of sps_scaling_matrix_designated_colour_space_flag is inferred to be equal to 1.
sps_dep_quant_enabled_flag equal to 0 specifies that dependent quantization is disabled and not used for pictures referring to the SPS. sps_dep_quant_enabled_flag equal to 1 specifies that dependent quantization is enabled and may be used for pictures referring to the SPS.
sps_sign_data_hiding_enabled_flag equal to 0 specifies that sign bit hiding is disabled and not used for pictures referring to the SPS. sps_sign_data_hiding_enabled_flag equal to 1 specifies that sign bit hiding is enabled and may be used for pictures referring to the SPS. When sps_sign_data_hiding_enabled_flag is not present, it is inferred to be equal to 0.
sps_virtual_boundaries_enabled_flag equal to 1 specifies that disabling in-loop filtering across virtual boundaries is enabled and may be applied in the coded pictures in the CLVS. sps_virtual_boundaries_enabled_flag equal to 0 specifies that disabling in-loop filtering across virtual boundaries is disabled and not applied in the coded pictures in the CLVS. In-loop filtering operations include the deblocking filter, sample adaptive offset filter, and adaptive loop filter operations.

sps_virtual_boundaries_present_flag equal to 1 specifies that information of virtual boundaries is signalled in the SPS. sps_virtual_boundaries_present_flag equal to 0 specifies that information of virtual boundaries is not signalled in the SPS. When there is one or more than one virtual boundaries signalled in the SPS, the in-loop filtering operations are disabled across the virtual boundaries in pictures referring to the SPS. In-loop filtering operations include the deblocking filter, sample adaptive offset filter, and adaptive loop filter operations.

It is a requirement of bitstream conformance that when the value of sps_res_change_in_clvs_allowed_flag is equal to 1, the value of sps_virtual_boundaries_present_flag shall be equal to 0.

sps_num_ver_virtual_boundaries specifies the number of sps_virtual_boundary_pos_x[i] syntax elements that are present in the SPS. When sps_num_ver_virtual_boundaries is not present, it is inferred to be equal to 0.

sps_virtual_boundary_pos_x[i] specifies the location of the i-th vertical virtual boundary in units of luma samples divided by 8. The value of sps_virtual_boundary_pos_x[i] shall be in the range of 1 to Ceil(sps_pic_width_max_in_luma_samples÷ 8)−1, inclusive.

sps_num_hor_virtual_boundaries specifies the number of sps_virtual_boundary_pos_y[i] syntax elements that are present in the SPS. When sps_num_hor_virtual_boundaries is not present, it is inferred to be equal to 0.

When sps_virtual_boundaries_enabled_flag is equal to 1 and sps_virtual_boundaries_present_flag is equal to 1, the sum of sps_num_ver_virtual_boundaries and sps_num_hor_virtual_boundaries shall be greater than 0.

sps_virtual_boundary_pos_y[i] specifies the location of the i-th horizontal virtual boundary in units of luma samples divided by 8. The value of sps_virtual_boundary_pos_y[i] shall be in the range of 1 to Ceil(sps_pic_height_max_in_luma_samples÷ 8)−1, inclusive.

sps_general_hrd_params_present_flag equal to 1 specifies that the SPS contains a general_hrd_parameters( ) syntax structure and an ols_hrd_parameters( ) syntax structure. sps_general_hrd_params_present_flag equal to 0 specifies that the SPS does not contain a general_hrd_parameters( ) syntax structure or an ols_hrd_parameters( ) syntax structure.

sps_sublayer_cpb_params_present_flag equal to 1 specifies that the ols_hrd_parameters( ) syntax structure in the SPS includes HRD parameters for sublayer representations with TemporalId in the range of 0 to sps_max_sublayers_minus1, inclusive. sps_sublayer_cpb_params_present_flag equal to 0 specifies that the ols_hrd_parameters( ) syntax structure in the SPS includes HRD parameters for the sublayer representation with TemporalId equal to sps_max_sublayers_minus1 only. When sps_max_sublayers_minus1 is equal to 0, the value of sps_sublayer_cpb_params_present_flag is inferred to be equal to 0.

When sps_sublayer_cpb_params_present_flag is equal to 0, the HRD parameters for the sublayer representations with TemporalId in the range of 0 to sps_max_sublayers_minus1−1, inclusive, are inferred to be the same as that for the sublayer representation with TemporalId equal to sps_max_sublayers_minus1. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

sps_field_seq_flag equal to 1 indicates that the CLVS conveys pictures that represent fields. sps_field_seq_flag equal to 0 indicates that the CLVS conveys pictures that represent frames. When general_frame_only_constraint_flag is equal to 1, the value of sps_field_seq_flag shall be equal to 0.

When sps_field_seq_flag is equal to 1, a frame-field information SEI message shall be present for every coded picture in the CLVS.

NOTE—The specified decoding process does not treat pictures that represent fields or frames differently. A sequence of pictures that represent fields would therefore be coded with the picture dimensions of an individual field. For example, pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

sps_vui_parameters_present_flag equal to 1 specifies that the syntax structure vui_parameters( ) is present in the SPS RBSP syntax structure. sps_vui_parameters_present_flag equal to 0 specifies that the syntax structure vui_parameters( ) is not present in the SPS RBSP syntax structure.

sps_extension_flag equal to 0 specifies that no sps_extension_data_flag syntax elements are present in the SPS RBSP syntax structure. sps_extension_flag equal to 1 specifies that there are sps_extension_data_flag syntax elements present in the SPS RBSP syntax structure.

sps_extension_data_flag may have any value. Its presence and value do not affect decoder conformance to profiles specified in this version of this Specification. Decoders conforming to this version of this Specification shall ignore all sps_extension_data_flag syntax elements.

As provided in Table 2, a NAL unit may include a pic_parameter_set_rbsp (PPS) syntax structure. Table 4 illustrates the syntax structure of the decoding capability information provided in JVET-R2001.

TABLE 4

| | Descriptor |
|---|---|
| pic_parameter_set_rbsp( ) { | |
|   pps_pic_parameter_set_id | u(6) |
|   pps_seq_parameter_set_id | u(4) |
|   pps_mixed_nalu_types_in_pic_flag | u(1) |
|   pps_pic_width_in_luma_samples | ue(v) |
|   pps_pic_height_in_luma_samples | ue(v) |
|   pps_conformance_window_flag | u(1) |
|   if( pps_conformance_window_flag ) { | |
|     pps_conf_win_left_offset | ue(v) |

TABLE 4-continued

| | Descriptor |
|---|---|
|     pps_conf_win_right_offset | ue(v) |
|     pps_conf_win_top_offset | ue(v) |
|     pps_conf_win_bottom_offset | ue(v) |
| } | |
| pps_scaling_window_explicit_signalling_flag | u(1) |
| if( pps_scaling_window_explicit_signalling_flag ) { | |
|     pps_scaling_win_left_offset | se(v) |
|     pps_scaling_win_right_offset | se(v) |
|     pps_scaling_win_top_offset | se(v) |
|     pps_scaling_win_bottom_offset | se(v) |
| } | |
| pps_output_flag_present_flag | u(1) |
| pps_no_pic_partition_flag | u(1) |
| pps_subpic_id_mapping_present_flag | u(1) |
| if( pps_subpic_id_mapping_present_flag ) { | |
|   if( !pps_no_pic_partition_flag ) | |
|     pps_num_subpics_minus1 | ue(v) |
|   pps_subpic_id_len_minus1 | ue(v) |
|   for( i = 0; i <= pps_num_subpic_minus1; i++ ) | |
|     pps_subpic_id[ i ] | u(v) |
| } | |
| if( !pps_no_pic_partition_flag ) { | |
|   pps_log2_ctu_size_minus5 | u(2) |
|   pps_num_exp_tile_columns_minus1 | ue(v) |
|   pps_num_exp_tile_rows_minus1 | ue(v) |
|   for( i = 0; i <= pps_num_exp_tile_columns_minus1; i++ ) | |
|     pps_tile_column_width_minus1[ i ] | ue(v) |
|   for( i = 0; i <= pps_num_exp_tile_rows_minus1; i++ ) | |
|     pps_tile_row_height_minus1[ i ] | ue(v) |
|   if( NumTilesInPic > 1 ) { | |
|     pps_loop_filter_across_tiles_enabled_flag | u(1) |
|     pps_rect_slice_flag | u(1) |
|   } | |
|   if( pps_rect_slice_flag ) | |
|     pps_single_slice_per_subpic_flag | u(1) |
|   if( pps_rect_slice_flag && !pps_single_slice_per_subpic_flag ) { | |
|     pps_num_slices_in_pic_minus1 | ue(v) |
|     if( pps_num_slices_in_pic_minus1 > 1 ) | |
|       pps_tile_idx_delta_present_flag | u(1) |
|     for( i = 0; i < pps_num_slices_in_pic_minus1; i++ ) { | |
|       if( SliceTopLeftTileIdx[ i ] % NumTileColumns != NumTileColumns − 1 ) | |
|         pps_slice_width_in_tiles_minus1[ i ] | ue(v) |
|       if( SliceTopLeftTileIdx[ i ] / NumTileColumns != NumTileRows − 1 && | |
|         ( pps_tile_idx_delta_present_flag \|\| | |
|         SliceTopLeftTileIdx[ i ] % NumTileColumns = = 0 ) ) | |
|         pps_slice_height_in_tiles_minus1[ i ] | ue(v) |
|       if( pps_slice_width_in_tiles_minus1[ i ] = = 0 && | |
|         pps_slice_height_in_tiles_minus1[ i ] = = 0 && | |
|         RowHeight[ SliceTopLeftTileIdx[ i ] / NumTileColumns ] > 1 ) { | |
|         pps_num_exp_slices_in_tile[ i ] | ue(v) |
|         for( j = 0; j < pps_num_exp_slices_in_tile[ i ]; j++ ) | |
|           pps_exp_slice_height_in_ctus_minus1[ i ][ j ] | ue(v) |
|         i += NumSlicesInTile[ i ] − 1 | |
|       } | |
|       if( pps_tile_idx_delta_present_flag && i < pps_num_slices_in_pic_minus1 ) | |
|         pps_tile_idx_delta_val[ i ] | se(v) |
|     } | |
|   } | |
|   if( !pps_rect_slice_flag \|\| pps_single_slice_per_subpic_flag \|\| | |
|     pps_num_slices_in_pic_minus1 > 0 ) | |
|     pps_loop_filter_across_slices_enabled_flag | u(1) |
| } | |
| pps_cabac_init_present_flag | u(1) |
| for( i = 0; i < 2; i++ ) | |
|   pps_num_ref_idx_default_active_minus1[ i ] | ue(v) |
| pps_rpl1_idx_present_flag | u(1) |
| pps_init_qp_minus26 | se(v) |
| pps_cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |

TABLE 4-continued

|  | Descriptor |
|---|---|
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } |  |
| if( pps_cu_chroma_qp_offset_list_enabled_flag ) { |  |
|   pps_chroma_qp_offset_list_len_minus1 | ue(v) |
|   for( i = 0; i <= pps_chroma_qp_offset_list_len_minus1; i++ ) { |  |
|     pps_cb_qp_offset_list[ i ] | se(v) |
|     pps_cr_qp_offset_list[ i ] | se(v) |
|     if( pps_joint_cbcr_qp_offset_present_flag ) |  |
|       pps_joint_cbcr_qp_offset_list[ i ] | se(v) |
|   } |  |
| } |  |
| pps_weighted_pred_flag | u(1) |
| pps_weighted_bipred_flag | u(1) |
| pps_deblocking_filter_control_present_flag | u(1) |
| if( pps_deblocking_filter_control_present_flag ) { |  |
|   pps_deblocking_filter_override_enabled_flag | u(1) |
|   pps_deblocking_filter_disabled_flag | u(1) |
|   if( !pps_no_pic_partition_flag && pps_deblocking_filter_override_enabled_flag ) |  |
|     pps_dbf_info_in_ph_flag | u(1) |
|   if( !pps_deblocking_filter_disabled_flag ) { |  |
|     pps_luma_beta_offset_div2 | se(v) |
|     pps_luma_tc_offset_div2 | se(v) |
|     if( pps_chroma_tool_offsets_present_flag ) { |  |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     } |  |
|   } |  |
| } |  |
| if( !pps_no_pic_partition_flag ) { |  |
|   pps_rpl_info_in_ph_flag | u(1) |
|   pps_sao_info_in_ph_flag | u(1) |
|   pps_alf_info_in_ph_flag | u(1) |
|   if( ( pps_weighted_pred_flag \|\| pps_weighted_bipred_flag ) && |  |
|     pps_rpl_info_in_ph_flag ) |  |
|     pps_wp_info_in_ph_flag | u(1) |
|   pps_qp_delta_info_in_ph_flag | u(1) |
| } |  |
| pps_ref_wraparound_enabled_flag | u(1) |
| if( pps_ref_wraparound_enabled_flag ) |  |
|   pps_pic_width_minus_wraparound_offset | ue(v) |
| pps_picture_header_extension_present_flag | u(1) |
| pps_slice_header_extension_present_flag | u(1) |
| pps_extension_flag | u(1) |
| if( pps_extension_flag ) |  |
|   while( more_rbsp_data( ) ) |  |
|     pps_extension_data_flag | u(1) |
| rbsp_trailing_bits( ) |  |
| } |  |

With respect to Table 4, JVET-R2001 provides the following semantics:

A PPS RBSP shall be available to the decoding process prior to it being referenced, included in at least one AU with TemporalId less than or equal to the TemporalId of the PPS NAL unit or provided through external means. All PPS NAL units with a particular value of pps_pic_parameter_set_id within a PU shall have the same content.

pps_pic_parameter_set_id identifies the PPS for reference by other syntax elements.

PPS NAL units, regardless of the nuh_layer_id values, share the same value space of pps_pic_parameter_set_id.

Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and all OLSs specified by the VPS that contain the layer with nuh_layer_id equal to vclLayerId also contain the layer with nuh_layer_id equal to ppslayerId.

pps_seq_parameter_set_id specifies the value of sps_seq_parameter_set_id for the SPS. The value of pps_seq_parameter_set_id shall be in the range of 0 to 15, inclusive. The value of pps_seq_parameter_set_id shall be the same in all PPSs that are referred to by coded pictures in a CLVS.

pps_mixed_nalu_types_in_pic_flag equal to 1 specifies that each picture referring to the PPS has more than one VCL NAL unit and the VCL NAL units do not have the same value of nal_unit_type. pps_mixed_nalu_types_in_pic_flag equal to 0 specifies that each picture referring to the PPS has one or more VCL NAL units and the VCL NAL units of each picture refering to the PPS have the same value of nal_unit_type.

When no_mixed_nalu_types_in_pic_constraint_flag is equal to 1, the value of pps_mixed_nalu_types_in_pic_flag shall be equal to 0.

NOTE—pps_mixed_nalu_types_in_pic_flag equal to 1 indicates that pictures referring to the PPS contain slices with different NAL unit types, e.g., coded pictures originating from a subpicture bitstream merging operation for which encoders have to ensure matching bitstream structure and further alignment of parameters of the original bitstreams. One example of such alignments is as follows: When the value of sps_idr_rpl_present_flag is equal to 0 and pps_mixed_nalu_types_in_pic_flag is equal to 1, a picture referring to the PPS cannot have slices with nal_unit_type equal to IDR_W_RADL or IDR_N_LP.

pps_pic_width_in_luma_samples specifies the width of each decoded picture referring to the PPS in units of luma samples. pps_pic_width_in_luma_samples shall not be equal to 0, shall be an integer multiple of Max(8, MinCbSizeY), and shall be less than or equal to sps_pic_width_max_in_luma_samples.

When sps_res_change_in_clvs_allowed_flag equal to 0, the value of pps_pic_width_in_luma_samples shall be equal to sps_pic_width_max_in_luma_samples.

When sps_ref_wraparound_enabled_flag is equal to 1, the value of (CtbSizeY/MinCbSizeY+1) shall be less than or equal to the value of (pps_pic_width_in_luma_samples/MinCbSizeY−1).

pps_pic_height_in_luma_samples specifies the height of each decoded picture referring to the PPS in units of luma samples. pps_pic_height_in_luma_samples shall not be equal to 0 and shall be an integer multiple of Max(8, MinCbSizeY), and shall be less than or equal to sps_pic_height_max_in_luma_samples.

When sps_res_change_in_clvs_allowed_flag equal to 0, the value of pps_pic_height_in_luma_samples shall be equal to sps_pic_height_max_in_luma_samples.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

> PicWidthInCtbsY=Ceil(pps_pic_width_in_luma_samples CtbSizeY)
>
> PicHeightInCtbsY=Ceil(pps_pic_height_in_luma_samples CtbSizeY)
>
> PicSizeInCtbsY=PicWidthInCtbsY*PicHeightInCtbsY
>
> PicWidthInMinCbsY=pps_pic_width_in_luma_samples/MinCbSizeY
>
> PicHeightInMinCbsY=pps_pic_height_in_luma_samples/MinCbSizeY
>
> PicSizeInMinCbsY=PicWidthInMinCbsY*PicHeightInMinCbsY
>
> PicSizeInSamplesY=pps_pic_width_in_luma_samples*pps_pic_height_in_luma_samples
>
> PicWidthInSamplesC=pps_pic_width_in_luma_samples/SubWidthC
>
> PicHeightInSamplesC=pps_pic_height_in_luma_samples/SubHeightC pps_conformance_window_flag equal to 1 specifies that the conformance cropping window offset parameters follow next in the PPS. pps_conformance_window_flag equal to 0 specifies that the conformance cropping window offset parameters are not present in the PPS.

When pps_pic_width_in_luma_samples is equal to sps_pic_width_max_in_luma_samples and pps_pic_height_in_luma_samples is equal to sps_pic_height_max_in_luma_samples, the value of pps_conformance_window_flag shall be equal to 0.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output.

When pps_conformance_window_flag is equal to 0, the following applies:
  If pps_pic_width_in_luma_samples is equal to sps_pic_width_max_in_luma_samples and pps_pic_height_in_luma_samples is equal to sps_pic_height_max_in_luma_samples, the values of pps_conf_win_left_offset, pps_conf_win_right_offset, pps_conf_win_top_offset, and pps_conf_win_bottom_offset are inferred to be equal to sps_conf_win_left_offset, sps_conf_win_right_offset, sps_conf_win_top_offset, and sps_conf_win_bottom_offset, respectively.
  Otherwise, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pps_pic_width_in_luma_samples−(SubWidthC*pps_conf_win_right_offset+1) and vertical picture coordinates from SubHeightC*pps_conf_win_top_offset to pps_pic_height_in_luma_samples−(SubHeightC*pps_conf_win_bottom_offset+1), inclusive.

The value of SubWidthC*(pps_conf_win_left_offset+pps_conf_win_right_offset) shall be less than pps_pic_width_in_luma_samples, and the value of SubHeightC*(pps_conf_win_top_offset+pps_conf_win_bottom_offset) shall be less than pps_pic_height_in_luma_samples.

When ChromaArrayType is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pps_pic_width_in_luma_samples and pps_pic_height_in_luma_samples, respectively, ppsA and ppsB shall have the same values of pps_conf_win_left_offset, pps_conf_win_right_offset, pps_conf_win_top_offset, and pps_conf_win_bottom_offset, respectively.

When pps_pic_width_in_luma_samples is equal to sps_pic_width_max_in_luma_samples and pps_pic_height_in_luma_samples is equal to sps_pic_height_max_in_luma_samples, it is a requirement of bitstream conformance that pps_conf_win_left_offset, pps_conf_win_right_offset, pps_conf_win_top_offset, and pps_conf_win_bottom_offset, are equal to sps_conf_win_left_offset, sps_conf_win_right_offset, sps_conf_win_top_offset, and sps_conf_win_bottom_offset, respectively.

pps_scaling_window_explicit_signalling_flag equal to 1 specifies that the scaling window offset parameters are present in the PPS. pps_scaling_window_explicit_signalling_flag equal to 0 specifies that the scaling window offset parameters are not present in the PPS. When sps_ref_pic_resampling_enabled_flag is equal to 0, the value of pps_scaling_window_explicit_signalling_flag shall be equal to 0.

pps_scaling_win_left_offset, pps_scaling_win_right_offset, pps_scaling_win_top_offset, and pps_scaling_win_bottom_offset specify the offsets that are applied to the picture size for scaling ratio calculation. When not present, the values of pps_scaling_win_left_offset, pps_scaling_win_right_offset, pps_scaling_win_top_offset, and pps_scaling_win_bottom_offset are inferred to be equal to pps_conf_win_left_offset, pps_conf_win_right_offset, pps_conf_win_top_offset, and pps_conf_win_bottom_offset, respectively.

The value of SubWidthC*(Abs(pps_scaling_win_left_offset)+Abs(pps_scaling_win_right_offset)) shall be less than pps_pic_width_in_luma_samples, and the value of SubHeightC*(Abs(pps_scaling_win_top_offset)+Abs(pps_scaling_win_bottom_offset)) shall be less than pps_pic_height_in_luma_samples.

The variables CurrPicScalWinWidthL and CurrPicScalWinHeightL are derived as follows:

CurrPicScalWinWidthL=pps_pic_width_in_luma_samples−SubWidthC*(pps_scaling_win_right_offset+pps_scaling_win_left_offset)

CurrPicScalWinHeightL=pps_pic_height_in_luma_samples−SubHeightC*(pps_scaling_win_bottom_offset+pps_scaling_win_top_offset)

Let refPicScalWinWidthL and refPicScalWinHeightL be the CurrPicScalWinWidthL and CurrPicScalWinHeightL, respectively, of a reference picture of a current picture referring to this PPS. It is a requirement of bitstream conformance that all of the following conditions shall be satisfied:
  CurrPicScalWinWidthL*2 is greater than or equal to refPicScalWinWidthL.
  CurrPicScalWinHeightL*2 is greater than or equal to refPicScalWinHeightL.
  CurrPicScalWinWidthL is less than or equal to refPicScalWinWidthL*8.
  CurrPicScalWinHeightL is less than or equal to refPicScalWinHeightL*8.
  CurrPicScalWinWidthL*sps_pic_width_max_in_luma_samples is greater than or equal to refPicScalWinWidthL*(pps_pic_width_in_luma_samples−Max(8, MinCbSizeY)).
  CurrPicScalWinHeightL*sps_pic_height_max_in_luma_samples is greater than or equal to refPicScalWinHeightL*(pps_pic_height_in_luma_samples−Max(8, MinCbSizeY)).

pps_output_flag_present_flag equal to 1 specifies that the ph_pic_output_flag syntax element is present in PHs referring to the PPS. pps_output_flag_present_flag equal to 0 specifies that the ph_pic_output_flag syntax element is not present in PHs referring to the PPS.

pps_no_pic_partition_flag equal to 1 specifies that no picture partitioning is applied to each picture referring to the PPS. pps_no_pic_partition_flag equal to 0 specifies that each picture referring to the PPS may be partitioned into more than one tile or slice.

It is a requirement of bitstream conformance that the value of pps_no_pic_partition_flag shall be the same for all PPSs that are referred to by coded pictures within a CLVS.

When sps_num_subpics_minus1 is greater than 0 or pps_mixed_nalu_types_in_pic_flag is equal to 1, the value of pps_no_pic_partition_flag shall be equal to 0.

pps_subpic_id_mapping_present_flag equal to 1 specifies that the subpicture ID mapping is signalled in the PPS. pps_subpic_id_mapping_present_flag equal to 0 specifies that the subpicture ID mapping is not signalled in the PPS.

If sps_subpic_id_mapping_explicitly_signalled_flag is 0 or sps_subpic_id_mapping_present_flag is equal to 1, the value of pps_subpic_id_mapping_present_flag shall be equal to 0. Otherwise (sps_subpic_id_mapping_explicitly_signalled_flag is equal to 1 and sps_subpic_id_mapping_present_flag is equal to 0), the value of pps_subpic_id_mapping_present_flag shall be equal to 1.

pps_num_subpics_minus1 shall be equal to sps_num_subpics_minus1. When no_pic_partition_flag is equal to 1, the value of pps_num_subpics_minus1 is inferred to be equal to 0.

pps_subpic_id_len_minus1 shall be equal to sps_subpic_id_len_minus1.

pps_subpic_id[i] specifies the subpicture ID of the i-th subpicture. The length of the pps_subpic_id[i] syntax element is pps_subpic_id_len_minus1+1 bits.

The variable SubpicIdVal[i], for each value of i in the range of 0 to sps_num_subpics_minus1, inclusive, is derived as follows:

```
for( i = 0; i <= sps_num_subpics_minus1; i++ )
  if( sps_subpic_id_mapping_explicitly_signalled_flag )
    SubpicIdVal[ i ] = pps_subpic_id_mapping_present_flag ?
      pps_subpic_id[ i ] : sps_subpic_id[ i ]
  else
    SubpicIdVal[ i ] = i
```

It is a requirement of bitstream conformance that both of the following constraints apply:
  For any two different values of i and j in the range of 0 to sps_num_subpics_minus1, inclusive, SubpicIdVal[i] shall not be equal to SubpicIdVal[j].
  For each value of i in the range of 0 to sps_num_subpics_minus1, inclusive, when the value of SubpicIdVal[i] of a current picture, with nuh_layer_id equal to a particular value layerId, is not equal to the value of SubpicIdVal[i] of a reference picture that has nuh_layer_id equal to layerId, the active entries of the RPLs of the coded slices in the i-th subpicture of the current picture shall not include that reference picture.

pps_log 2_ctu_size_minus5 plus 5 specifies the luma coding tree block size of each CTU. pps_log 2_ctu_size_minus5 shall be equal to sps_log 2_ctu_size_minus5.

pps_num_exp_tile_columns_minus1 plus 1 specifies the number of explicitly provided tile column widths. The value of pps_num_exp_tile_columns_minus1 shall be in the range of 0 to PicWidthInCtbsY−1, inclusive. When pps_no_pic_partition_flag is equal to 1, the value of pps_num_exp_tile_columns_minus1 is inferred to be equal to 0.

pps_num_exp_tile_rows_minus1 plus 1 specifies the number of explicitly provided tile row heights. The value of pps_num_exp_tile_rows_minus1 shall be in the range of 0 to PicHeightInCtbsY−1, inclusive. When pps_no_pic_partition_flag is equal to 1, the value of num_tile_rows_minus1 is inferred to be equal to 0.

pps_tile_column_width_minus1[i] plus 1 specifies the width of the i-th tile column in units of CTBs for i in the range of 0 to pps_num_exp_tile_columns_minus1, inclusive. pps_tile_column_width_minus1[pps_num_exp_tile_columns_minus1] is also used to derive the widths of the tile columns with index greater than pps_num_exp_tile_columns_minus1 as specified. The value of pps_tile_column_width_minus1[i] shall be in the range of 0 to PicWidthInCtbsY−1, inclusive. When not present, the value of pps_tile_column_width_minus1 [0] is inferred to be equal to PicWidthInCtbsY−1.

pps_tile_row_height_minus1[i] plus 1 specifies the height of the i-th tile row in units of CTBs for i in the range of 0 to pps_num_exp_tile_rows_minus1, inclusive. pps_tile_row_height_minus1 [pps_num_exp_tile_rows_minus1] is also used to derive the heights of the tile rows with index greater than pps_num_exp_tile_rows_minus1 as specified. The value of pps_tile_row_height_minus1 [i] shall be in the range of 0 to PicHeightInCtbsY−1, inclusive. When not present, the value of pps_tile_row_height_minus1 [0] is inferred to be equal to PicHeightInCtbsY−1.

pps_loop_filter_across_tiles_enabled_flag equal to 1 specifies that in-loop filtering operations across tile boundaries are enabled and may be performed across tile boundaries in pictures referring to the PPS. pps_loop_filter_across_tiles_enabled_flag equal to 0 specifies that in-loop filtering operations across tile boundaries are disabled and not performed across tile boundaries in pictures referring to the PPS. The in-loop filtering operations include the deblocking filter, sample adaptive offset filter, and adaptive loop filter operations. When not present, the value of pps_loop_filter_across_tiles_enabled_flag is inferred to be equal to 1.

pps_rect_slice_flag equal to 0 specifies that tiles within each slice are in raster scan order and the slice information is not signalled in PPS. pps_rect_slice_flag equal to 1 specifies that tiles within each slice cover a rectangular region of the picture and the slice information is signalled in the PPS. When not present, pps_rect_slice_flag is inferred to be equal to 1. When sps_subpic_info_present_flag is equal to 1 or pps_mixed_nalu_types_in_pic_flag is equal to 1, the value of pps_rect_slice_flag shall be equal to 1.

pps_single_slice_per_subpic_flag equal to 1 specifies that each subpicture consists of one and only one rectangular slice. pps_single_slice_per_subpic_flag equal to 0 specifies that each subpicture may consist of one or more rectangular slices. When not present, the value of pps_single_slice_per_subpic_flag is inferred to be equal to 1.

pps_num_slices_in_pic_minus1 plus 1 specifies the number of rectangular slices in each picture referring to the PPS. The value of pps_num_slices_in_pic_minus1 shall be in the range of 0 to MaxSlicesPerPicture−1, inclusive, where MaxSlicesPerPicture is specified in Annex A. When pps_no_pic_partition_flag is equal to 1, the value of pps_num_slices_in_pic_minus1 is inferred to be equal to 0. When pps_single_slice_per_subpic_flag is equal to 1, the value of pps_num_slices_in_pic_minus1 is inferred to be equal to sps_num_subpics_minus1.

pps_tile_idx_delta_present_flag equal to 0 specifies that pps_tile_idx_delta_val[i] syntax elements are not present in the PPS and all pictures referring to the PPS are partitioned into rectangular slice rows and rectangular slice columns in slice raster order. pps_tile_idx_delta_present_flag equal to 1 specifies that pps_tile_idx_delta_val[i] syntax elements may be present in the PPS and all rectangular slices in pictures referring to the PPS are specified in the order indicated by the values of the pps_tile_idx_delta_val[i] in increasing values of i. When not present, the value of pps_tile_idx_delta_present_flag is inferred to be equal to 0.

pps_slice_width_in_tiles_minus1[i] plus 1 specifies the width of the i-th rectangular slice in units of tile columns. The value of pps_slice_width_in_tiles_minus1 [i] shall be in the range of 0 to NumTileColumns−1, inclusive. When not present, the value of pps_slice_width_in_tiles_minus1 [i] is inferred to be equal to 0.

pps_slice_height_in_tiles_minus1[i] plus 1 specifies the height of the i-th rectangular slice in units of tile rows when pps_num_exp_slices_in_tile[i] is equal to 0. The value of pps_slice_height_in_tiles_minus1 [i] shall be in the range of 0 to NumTileRows−1, inclusive.

When pps_slice_height_in_tiles_minus1 [i] is not present, it is inferred as follows:
  If SliceTopLeftTileIdx[i]/NumTileColumns is equal to NumTileRows−1, the value of pps_slice_height_in_tiles_minus1 [i] is inferred to be equal to 0.
  Otherwise, the value of pps_slice_height_in_tiles_minus1 [i] is inferred to be equal to pps_slice_height_in_tiles_minus1 [i−1].

pps_num_exp_slices_in_tile[i] specifies the number of explicitly provided slice heights for the slices in the tile containing the i-th slice (i.e., the tile with tile index equal to SliceTopLeftTileIdx[i]). The value of pps_num_exp_slices_in_tile[i] shall be in the range of 0 to RowHeight[SliceTopLeftTileIdx[i]/NumTileColumns]−1, inclusive. When not present, the value of pps_num_exp_slices_in_tile [i] is inferred to be equal to 0.

NOTE—If pps_num_exp_slices_in_tile[i] is equal to 0, the tile containing the i-th slice is not split into multiple slices. Otherwise (pps_num_exp_slices_in_tile[i] is greater than 0), the tile containing the i-th slice may or may not be split into multiple slices.

pps_exp_slice_height_in_ctus_minus1[i][j] plus 1 specifies the height of the j-th rectangular slice in the tile containing the i-th slice, in units of CTU rows, for j in the range of 0 to pps_num_exp_slices_in_tile[i]−1, inclusive, when pps_num_exp_slices_in_tile[i] is greater than 0. pps_exp_slice_height_in_ctus_minus1 [i][pps_num_exp_slices_in_tile[i]] is also used to derive the heights of the rectangular slices in the tile containing the i-th slice with index greater than pps_num_exp_slices_in_tile[i]−1 as specified. The value of pps_exp_slice_height_in_ctus_minus1 [i][j] shall be in the range of 0 to RowHeight[SliceTopLeftTileIdx[i]/NumTileColumns]−1, inclusive.

pps_tile_idx_delta_val[i] specifies the difference between the tile index of the tile containing the first CTU in the (i+1)-th rectangular slice and the tile index of the tile containing the first CTU in the i-th rectangular slice. The value of pps_tile_idx_delta_val[i] shall be in the range of −NumTilesInPic+1 to NumTilesInPic−1, inclusive. When not present, the value of pps_tile_idx_delta_val[i] is inferred to be equal to 0. When present, the value of pps_tile_idx_delta_val[i] shall not be equal to 0.

When pps_rect_slice_flag is equal to 1, it is a requirement of bitstrream conformance that, for any two slices, with picture-level slice indices idxA and idxB, that belong to the same picture and different subpictures, when SubpicIdxForSlice[idxA] is less than SubpicIdxForSlice[idxB], the value of idxA shall be less than idxB.

pps_loop_filter_across_slices_enabled_flag equal to 1 specifies that in-loop filtering operations across slice boundaries are enabled and may be performed across slice boundaries in pictures referring to the PPS. loop_filter_across_slice_enabled_flag equal to 0 specifies that in-loop filtering operations across slice boundaries are disabled and not performed across slice boundaries in pictures referring to the PPS. The in-loop filtering operations include the deblocking filter, sample adaptive offset filter, and adaptive loop filter operations. When not present, the value of pps_loop_filter_across_slices_enabled_flag is inferred to be equal to 0.

pps_cabac_init_present_flag equal to 1 specifies that sh_cabac_init_flag is present in slice headers referring to the PPS. pps_cabac_init_present_flag equal to 0 specifies that sh_cabac_init_flag is not present in slice headers referring to the PPS.

pps_num_ref_idx_default_active_minus1[i] plus 1, when i is equal to 0, specifies the inferred value of the variable NumRefIdxActive[0] for P or B slices with sh_num_ref idx_active_override_flag equal to 0, and, when i is equal to 1, specifies the inferred value of NumRefIdxActive[1] for B slices with sh_num_ref idx_active_override_flag equal to 0. The value of pps_num_ref_idx_default_active_minus1[i] shall be in the range of 0 to 14, inclusive.

pps_rpl1_idx_present_flag equal to 0 specifies that rpl_sps_flag[1] and rpl_idx[1] are not present in the PH syntax structures or the slice headers for pictures referring to the PPS. pps_rpl1_idx_present_flag equal to 1 specifies that rpl_sps_flag[1] and rpl_idx[1] may be present in the PH syntax structures or the slice headers for pictures referring to the PPS.

pps_init_qp_minus26 plus 26 specifies the initial value of SliceQp$_Y$ for each slice referring to the PPS. The initial value of SliceQp$_Y$ is modified at the picture level when a non-zero value of ph_qp_delta is decoded or at the slice level when a non-zero value of sh_qp_delta is decoded. The value of pps_init_qp_minus26 shall be in the range of −(26+QpBdOffset) to +37, inclusive.

pps_cu_qp_delta_enabled_flag equal to 1 specifies that the ph_cu_qp_delta_subdiv_intra_slice and ph_cu_qp_delta_subdiv_inter_slice syntax elements are present in PHs referring to the PPS, and the cu_qp_delta_abs and cu_qp_delta_sign_flag syntax elements may be present in the transform unit syntax and the palette coding syntax. pps_cu_qp_delta_enabled_flag equal to 0 specifies that the ph_cu_qp_delta_subdiv_intra_slice and ph_cu_qp_delta_subdiv_inter_slice syntax elements are not present in PHs referring to the PPS, and the cu_qp_delta_abs and cu_qp_delta_sign_flag syntax elements are not present in the transform unit syntax or the palette coding syntax.

pps_chroma_tool_offsets_present_flag equal to 1 specifies that chroma tool offsets related syntax elements are present in the PPS RBSP syntax structure and the chroma deblocking t$_c$ and β offset syntax elements are present in the PHs or the SHs of pictures referring to the PPS. pps_chroma_tool_offsets_present_flag equal to 0 specifies that chroma tool offsets related syntax elements are not present in in the PPS RBSP syntax structure and the chroma deblocking t$_c$ and β offset syntax elements are not present in the PHs or the SHs of pictures referring to the PPS. When ChromaArrayType is equal to 0, the value of pps_chroma_tool_offsets_present_flag shall be equal to 0.

pps_cb_qp_offset and pps_cr_qp_offset specify the offsets to the luma quantization parameter Qp'$_Y$ used for deriving Qp'$_{Cb}$ and Qp'$_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value. When not present, the values of pps_cb_qp_offset and pps_cr_qp_offset are inferred to be equal to 0.

pps_joint_cbcr_qp_offset_present_flag equal to 1 specifies that pps_joint_cbcr_qp_offset_value and pps_joint_cbcr_qp_offset_list[i] are present in the PPS RBSP syntax structure. pps_joint_cbcr_qp_offset_present_flag equal to 0 specifies that pps_joint_cbcr_qp_offset_value and pps_joint_cbcr_qp_offset_list[i] are not present in the PPS RBSP syntax structure. When ChromaArrayType is equal to 0 or sps_joint_cbcr_enabled_flag is equal to 0, the value of pps_joint_cbcr_qp_offset_present_flag shall be equal to 0. When not present, the value of pps_joint_cbcr_qp_offset_present_flag is inferred to be equal to 0.

pps_joint_cbcr_qp_offset_value specifies the offset to the luma quantization parameter Qp'$_Y$ used for deriving Qp'$_{CbCr}$. The value of pps_joint_cbcr_qp_offset_value shall be in the range of −12 to +12, inclusive. When ChromaArrayType is equal to 0 or sps_joint_cbcr_enabled_flag is equal to 0, pps_joint_cbcr_qp_offset_value is not used in the decoding process and decoders shall ignore its value. When pps_joint_cbcr_qp_offset_present_flag is equal to 0, pps_joint_cbcr_qp_offset_value is not present and is inferred to be equal to 0.

pps_slice_chroma_qp_offsets_present_flag equal to 1 specifies that the sh_cb_qp_offset and sh_cr_qp_offset syntax elements are present in the associated slice headers. pps_slice_chroma_qp_offsets_present_flag equal to 0 specifies that the sh_cb_qp_offset and sh_cr_qp_offset syntax elements are not present in the associated slice headers. When not present, the value of pps_slice_chroma_qp_offsets_present_flag is inferred to be equal to 0.

pps_cu_chroma_qp_offset_list_enabled_flag equal to 1 specifies that the ph_cu_chroma_qp_offset_subdiv_intra_slice and ph_cu_chroma_qp_offset_subdiv_inter_slice syntax elements are present in PHs referring to the PPS and cu_chroma_qp_offset_flag may be present in the transform unit syntax and the palette coding syntax. pps_cu_chroma_qp_offset_list_enabled_flag equal to 0 specifies that the ph_cu_chroma_qp_offset_subdiv_intra_slice and ph_cu_chroma_qp_offset_subdiv_inter_slice syntax elements are not present in PHs referring to the PPS and the cu_chroma_qp_offset_flag is not present in the transform unit syntax and the palette coding syntax. When not present, the value of pps_cu_chroma_qp_offset_list_enabled_flag is inferred to be equal to 0.

pps_chroma_qp_offset_list_len_minus1 plus 1 specifies the number of pps_cb_qp_offset_list[i], pps_cr_qp_offset_list[i], and pps_joint_cbcr_qp_offset_list[i], syntax elements that are present in the PPS RBSP syntax structure. The value of pps_chroma_qp_offset_list_len_minus1 shall be in the range of 0 to 5, inclusive. pps_cb_qp_offset_list[i], pps_cr_qp_offset_list[i], and pps_joint_cbcr_qp_offset_lisf[i], specify offsets used in the derivation of Qp'$_{Cb}$, Qp'$_{Cr}$, and Qp'$_{CbCr}$, respectively. The values of pps_cb_qp_offset_list[i], pps_cr_qp_offset_list[i], and pps_joint_cbcr_qp_offset_list[i] shall be in the range of −12 to +12, inclusive. When pps_joint_cbcr_qp_offset_present_flag is equal to 0, pps_joint_cbcr_qp_offset_list[i] is not present and it is inferred to be equal to 0.

pps_weighted_pred_flag equal to 0 specifies that weighted prediction is not applied to P slices referring to the PPS. pps_weighted_pred_flag equal to 1 specifies that weighted prediction is applied to P slices referring to the PPS. When sps_weighted_pred_flag is equal to 0, the value of pps_weighted_pred_flag shall be equal to 0.

pps_weighted_bipred_flag equal to 0 specifies that explicit weighted prediction is not applied to B slices referring to the PPS. pps_weighted_bipred_flag equal to 1 specifies that explicit weighted prediction is applied to B slices referring to the PPS. When sps_weighted_bipred_flag is equal to 0, the value of pps_weighted_bipred_flag shall be equal to 0.

pps_deblocking_filter_control_present_flag equal to 1 specifies the presence of deblocking filter control syntax elements in the PPS. pps_deblocking_filter_control_present_flag equal to 0 specifies the absence of deblocking filter control syntax elements in the PPS and that the deblocking filter is applied for all slices referring to the PPS, using 0-valued deblocking β and t$_C$ offsets.

pps_deblocking_filter_override_enabled_flag equal to 1 specifies the presence of ph_deblocking_filter_override_flag in the PHs referring to the PPS or sh_deblocking_filter_override_flag in the slice headers referring to the PPS. pps_deblocking_filter_override_enabled_flag equal to 0 specifies the absence of ph_deblocking_filter_override_flag in PHs referring to the PPS or sh_deblocking_filter_override_flag in slice headers referring to the PPS. When not present, the value of pps_deblocking_filter_override_enabled_flag is inferred to be equal to 0.

pps_deblocking_filter_disabled_flag equal to 1 specifies that the operation of deblocking filter is not applied for slices referring to the PPS for which one of the following two conditions is true: 1) ph_deblocking_filter_disabled_flag and sh_deblocking_filter_disabled_flag are not present and inferred to be equal to 1 and 2) ph_deblockig_filter_disabled_flag or sh_deblocking_filter_disabled_flag is present and equal to 1, and also specifies that the operation of deblocking filter is applied for slices referring to the PPS for which one of the following two conditions is true: 1) ph_deblocking_filter_disabled_flag and sh_deblocking_filter_disabled_flag are not present and inferred to be equal to 0 and 2) ph_deblocking_filter_disabled_flag or sh_deblocking_filter_disabled_flag is present and equal to 0.

pps_deblocking_filter_disabled_flag equal to 0 specifies that the operation of the deblocking filter is applied for slices referring to the PPS for which one of the following two conditions is true: 1) ph_deblocking_filter_disabled_flag and sh_deblocking_filter_disabled_flag are not present and 2) ph_deblocking_filter_disabled_flag or sh_deblocking_filter_disabled_flag is present and equal to 0, and also specifies that the operation of deblocking filter is not applied for slices referring to the PPS for which ph_deblocking_filter_disabled_flag or sh_deblocking_filter_disabled_flag is present and equal to 1.

When not present, the value of pps_deblocking_filter_disabled_flag is inferred to be equal to 0.

pps_dbf_info_in_ph_flag equal to 1 specifies that deblocking filter information is present in the PH syntax structure and not present in slice headers referring to the PPS that do not contain a PH syntax structure. pps_dbf_info_in_ph_flag equal to 0 specifies that deblocking filter information is not present in the PH syntax structure and may be present in slice headers referring to the PPS. When not present, the value of pps_dbf_info_in_ph_flag is inferred to be equal to 0.

pps_luma_beta_offset_div2 and pps_luma_tc_offset_div2 specify the default deblocking parameter offsets for and tC (divided by 2) that are applied to the luma component for slices referring to the PPS, unless the default deblocking parameter offsets are overridden by the deblocking parameter offsets present in the picture headers or the slice headers of the slices referring to the PPS. The values of pps_luma_beta_offset_div2 and pps_luma_tc_offset_div2 shall both be in the range of −12 to 12, inclusive. When not present, the values of pps_luma_beta_offset_div2 and pps_luma_tc_offset_div2 are both inferred to be equal to 0.

pps_cb_beta_offset_div2 and pps_cb_tc_offset_div2 specify the default deblocking parameter offsets for $\beta$ and $t_C$ (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present, the values of pps_cb_beta_offset_div2 and pps_cb_tc_offset_div2 are inferred to be equal to pps_luma_beta_offset_div2 and pps_luma_tc_offset_div2, respectively.

pps_cr_beta_offset_div2 and pps_cr_tc_offset_div2 specify the default deblocking parameter offsets for $\beta$ and $t_C$ (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present, the values of pps_cr_beta_offset_div2 and pps_cr_tc_offset_div2 are inferred to be equal to pps_luma_beta_offset_div2 and pps_luma_tc_offset_div2, respectively.

pps_rpl_info_in_ph_flag equal to 1 specifies that reference picture list information is present in the PH syntax structure and not present in slice headers referring to the PPS that do not contain a PH syntax structure. pps_rpl_info_in_ph_flag equal to 0 specifies that reference picture list information is not present in the PH syntax structure and may be present in slice headers referring to the PPS. When not present, the value of pps_rpl_info_in_ph_flag is inferred to be equal to 0.

pps_sao_info_in_ph_flag equal to 1 specifies that SAO filter information is present in the PH syntax structure and not present in slice headers referring to the PPS that do not contain a PH syntax structure. pps_sao_info_in_ph_flag equal to 0 specifies that SAO filter information is not present in the PH syntax structure and may be present in slice headers referring to the PPS. When not present, the value of pps_sao_info_in_ph_flag is inferred to be equal to 0.

pps_alf_info_in_ph_flag equal to 1 specifies that ALF information is present in the PH syntax structure and not present in slice headers referring to the PPS that do not contain a PH syntax structure. pps_alf_info_in_ph_flag equal to 0 specifies that ALF information is not present in the PH syntax structure and may be present in slice headers referring to the PPS. When not present, the value of pps_alf_info_in_ph_flag is inferred to be equal to 0.

pps_wp_info_in_ph_flag equal to 1 specifies that weighted prediction information may be present in the PH syntax structure and not present in slice headers referring to the PPS that do not contain a PH syntax structure. pps_wp_info_in_ph_flag equal to 0 specifies that weighted prediction information is not present in the PH syntax structure and may be present in slice headers referring to the PPS. When not present, the value of pps_wp_info_in_ph_flag is inferred to be equal to 0.

pps_qp_delta_info_in_ph_flag equal to 1 specifies that QP delta information is present in the PH syntax structure and not present in slice headers referring to the PPS that do not contain a PH syntax structure. pps_qp_delta_info_in_ph_flag equal to 0 specifies that QP delta information is not present in the PH syntax structure and is present in slice headers referring to the PPS. When not present, the value of pps_qp_delta_info_in_ph_flag is inferred to be equal to 0.

pps_ref_wraparound_enabled_flag equal to 1 specifies that horizontal wrap-around motion compensation is enabled and may be applied in inter prediction in decoding of pictures referring to the PPS. pp s_ref_wraparound_enabled_flag equal to 0 specifies that horizontal wrap-around motion compensation is disabled and not applied in inter prediction in decoding of pictures referring to the PPS.

When sps_ref_wraparound_enabled_flag is equal to 0 or the value of CtbSizeY/MinCbSizeY+1 is greater than pps_pic_width_in_luma_samples/MinCbSizeY−1, the value of pps_ref_wraparound_enabled_flag shall be equal to 0.

pps_pic_width_minus_wraparound_offset specifies the difference between the picture width and the offset used for computing the horizontal wrap-around position in units of MinCbSizeY luma samples. The value of pps_pic_width_minus_wraparound_offset shall be less than or equal to (pps_pic_width_in_luma_samples/MinCbSizeY)−(CtbSizeY/MinCbSizeY)−2.

The variable PpsRefWraparoundOffset is set equal to pps_pic_width_in_luma_samples/MinCbSizeY−pps_pic_width_minus_wraparound_offset.

pps_picture_header_extension_present_flag equal to 0 specifies that no PH extension syntax elements are present in PHs referring to the PPS. pps_picture_header_extension_present_flag equal to 1 specifies that PH extension syntax elements are present in PHs referring to the PPS. pps_picture_header_extension_present_flag shall be equal to 0 in bitstreams conforming to this version of this Specification.

pps_slice_header_extension_present_flag equal to 0 specifies that no slice header extension syntax elements are present in the slice headers for coded pictures referring to the PPS. pps_slice_header_extension_present_flag equal to 1 specifies that slice header extension syntax elements are present in the slice headers for coded pictures referring to the PPS. pps_slice_header_extension_present_flag shall be equal to 0 in bitstreams conforming to this version of this Specification.

pps_extension_flag equal to 0 specifies that no pps_extension_data_flag syntax elements are present in the PPS RBSP syntax structure. pps_extension_flag equal to 1 specifies that there are pps_extension_data_flag syntax elements present in the PPS RBSP syntax structure.

pps_extension_data_flag may have any value. Its presence and value do not affect decoder conformance to profiles specified in this version of this Specification. Decoders conforming to this version of this Specification shall ignore all pps_extension_data_flag syntax elements.

According to the syntax provided in Table 3, in JVET-R2001, seq_parameter_set_rbsp( ) includes syntax element sps_reserved_zero_4 bits which includes reserved bits for future use. Further, seq_parameter_set_rbsp( ) has an extension mechanism which can be used in the future if needed. Also, no such reserved bits are included in PPS or VPS. Thus, syntax element sps_reserved_zero_4 bits may waste bits and be inconsistent with other parameter sets. According to the techniques described herein, seq_parameter_set_rbsp( ) may be modified to remove syntax element sps_reserved_zero_4 bits. Further, in one example, according to the techniques herein, fewer reserved bits (for example, fewer than 4) may be included in seq_parameter_set_rbsp( ) and/or reserved bits may be added to pic_parameter_set_rbsp( ).

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
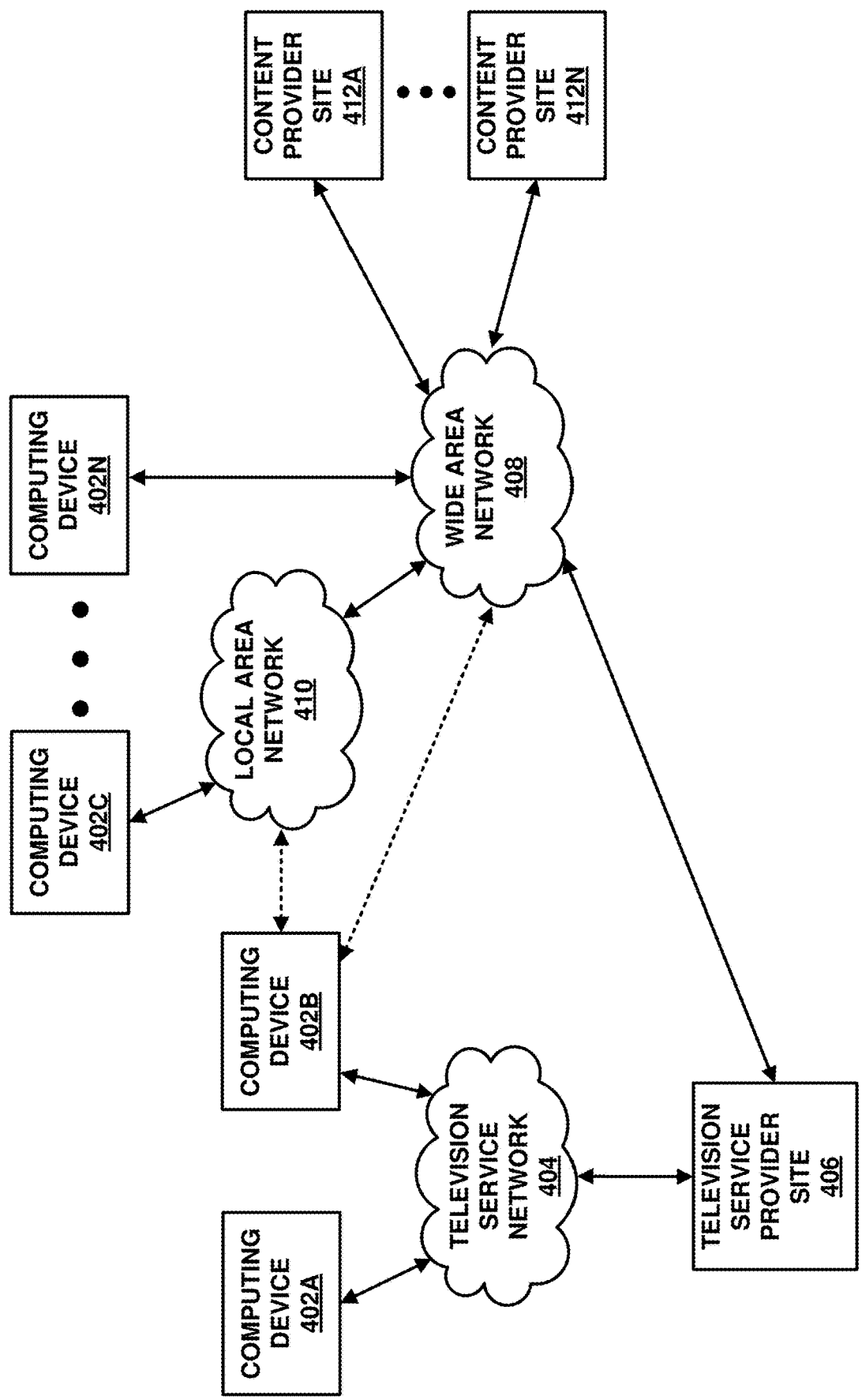
FIG. 4 is a conceptual drawing illustrating an example of components that may be included in an implementation of a system that may be configured to encode and decode video data according to one or more techniques of this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
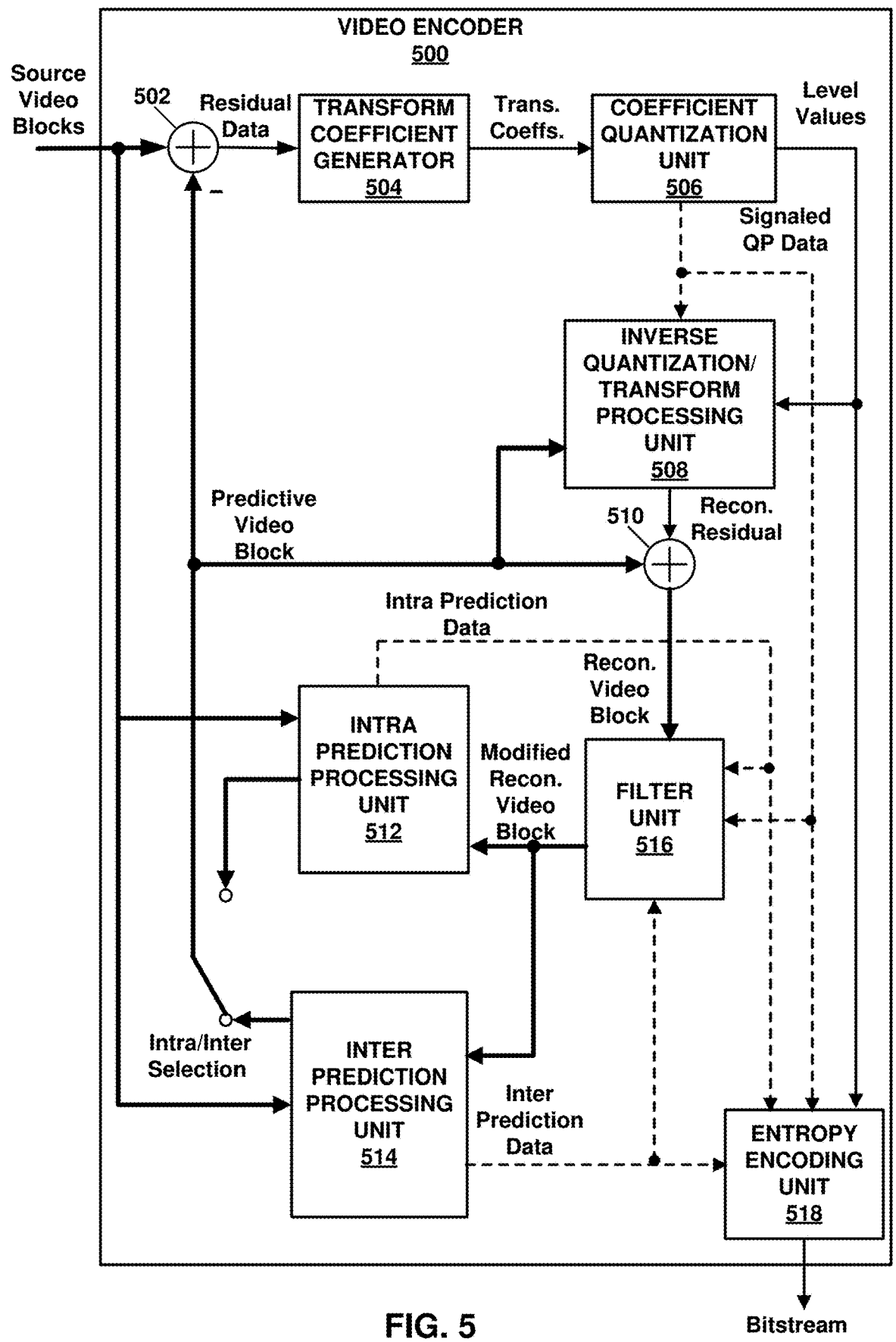
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a compliant bitstream forms a new compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, the signaling sequence parameter set information in JVET-R2001 may be less than ideal. That is, syntax element sps_reserved_zero_4 bits may waste bits and be inconsistent with other parameter sets. In one example, according to the techniques herein, seq_parameter_set_rbsp( ) may be modified to remove syntax element sps_reserved_zero_4 bits. Table 5 illustrates an example of the relevant portion of a seq_parameter_set_rbsp( ) syntax structure which may be signaled and/or parsed according to the techniques herein. With respect to Table 5 the semantics may be based on the semantics provided above. It should be noted that in Table 5 syntax elements sps_chroma_format_idc and sps_log 2_ctu_size_minus5 immediately follow syntax element sps_max_sublayers_minus1.

TABLE 5

|  | Descriptor |
| --- | --- |
| seq_parameter_set_rbsp( ) { |  |
|   sps_seq_parameter_set_id | u(4) |
|   sps_video_parameter_set_id | u(4) |
|   sps_max_sublayers_minus1 | u(3) |
|   sps_chroma_format_idc | u(2) |
|   sps_log2_ctu_size_minus5 | u(2) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   sps_gdr_enabled_flag | u(1) |
|   sps_ref_pic_resampling_enabled_flag | u(1) |
|   if( sps_ref_pic_resampling_enabled_flag ) |  |
|     sps_res_change_in_clvs_allowed_flag | u(1) |
|   sps_pic_width_max_in_luma_samples | ue(v) |
|   sps_pic_height_max_in_luma_samples | ue(v) |
|   sps_conformance_window_flag | u(1) |
|   if( sps_conformance_window_flag ) { |  |
|     sps_conf_win_left_offset | ue(v) |
|     sps_conf_win_right_offset | ue(v) |

TABLE 5-continued

|  | Descriptor |
| --- | --- |
|     sps_conf_win_top_offset | ue(v) |
|     sps_conf_win_bottom_offset | ue(v) |
|   } |  |
|   sps_subpic_info_present_flag | u(1) |
|   ... |  |
| } |  |

In another example, other syntax elements may be signaled in place of some reserved bits in seq_parameter_set_rbsp( ). Table 6 illustrates an example of the relevant portion of a seq_parameter_set_rbsp( ) syntax structure which may be signaled and/or parsed according to the techniques herein.

TABLE 6

|  | Descriptor |
| --- | --- |
| seq_parameter_set_rbsp( ) { |  |
|   sps_seq_parameter_set_id | u(4) |
|   sps_video_parameter_set_id | u(4) |
|   sps_max_sublayers_minus1 | u(3) |
|   sps_gdr_enabled_flag | u(1) |
|   sps_chroma_format_idc | u(2) |
|   sps_reserved_zero_1bit | u(1) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   sps_ref_pic_resampling_enabled_flag | u(1) |
|   if( sps_ref_pic_resampling_enabled_flag ) |  |
|     sps_res_change_in_clvs_allowed_flag | u(1) |
|   sps_pic_width_max_in_luma_samples | ue(v) |
|   sps_pic_height_max_in_luma_samples | ue(v) |
|   sps_conformance_window_flag | u(1) |
|   if( sps_conformance_window_flag ) { |  |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } |  |
|   sps_log2_ctu_size_minus5 | u(2) |
|   sps_subpic_info_present_flag | u(1) |
|   ... |  |
| } |  |

With respect to Table 6, the semantics may be based on the semantics provided above with the following semantics for sps_reserved_zero_1bit:

sps_reserved_zero_1bit shall be equal to 0 in bitstreams conforming to this version of this Specification. Other value for sps_reserved_zero_1bit is reserved for future use by ITU-T I ISO/IEC.

In another example, reserved bits may be included in a a pic_parameter_set_rbsp( ) Table 7 illustrates an example of the relevant portion of a pic_parameter_set_rbsp( ) syntax structure which may be signaled and/or parsed according to the techniques herein.

TABLE 7

|  | Descriptor |
| --- | --- |
| pic_parameter_set_rbsp( ) { |  |
|   pps_pic_parameter_set_id | u(6) |
|   pps_seq_parameter_set_id | u(4) |
|   pps_mixed_nalu_types_in_pic_flag | u(1) |
|   pps_reserved_zero_7bits | u(7) |

TABLE 7-continued

| | Descriptor |
|---|---|
| pps_pic_width_in_luma_samples | ue(v) |
| pps_pic_height_in_luma_samples | ue(v) |
| pps_conformance_window_flag | u(1) |
| ... | |
| } | |

With respect to Table 7, the semantics may be based on the semantics provided above with the following semantics for pps_reserved_zero_7 bits:

pps_reserved_zero_7 bits shall be equal to 0 in bitstreams conforming to this version of this Specification. Other values for pps_reserved_zero_7 bits are reserved for future use by ITU-T I ISO/IEC.

Further, in some examples, a number of fixed length syntax elements can be moved in a PPS to be before the first ue(v) coded syntax element, i.e., syntax element pps_pic_width_in_luma_samples. A combination of these syntax elements and reserve bits may be used to ensure byte alignment before the first ue(v) coded syntax element, e.g. pps_pic_width_in_luma_samples).

It should be noted that the VVC design allows some sharing of SPSs across layers. However, there are constraints with respect to this sharing. In JVET-R2001, syntax element sps_seq_parameter_set_id is coded as u(4). As a result, a maximum of 16 SPSs with unique values of sps_seq_parameter_set_id are possible. In contrast, in ITU-T H.265, syntax element sps_seq_parameter_set_id is coded as a ue(v) code, which allows for a higher number of SPSs for future extensibility. In one example, according to the techniques herein, a value of 15 for sps_seq_parameter_set_id may be kept as a reserved value for future extensibility. That is, in one example, the semantics of syntax element sps_seq_parameter_set_id and pps_seq_parameter_set_id may be based on the following:

sps_seq_parameter_set_id provides an identifier for the SPS for reference by other syntax elements. The value of sps_seq_parameter_set_id shall be in the range of 0 to 14, inclusive. The value 15 for sps_seq_parameter_set_id is reserved for future use by ITU-T I ISO/IEC.

SPS NAL units, regardless of the nuh_layer_id values, share the same value space of sps_seq_parameter_set_id. Let spsLayerId be the value of the nuh_layer_id of a particular SPS NAL unit, and vclLayerId be the value of the nuh_layer_id of a particular VCL NAL unit. The particular VCL NAL unit shall not refer to the particular SPS NAL unit unless spsLayerId is less than or equal to vclLayerId and all OLSs specified by the VPS that contain the layer with nuh_layer_id equal to vclLayerId also contain the layer with nuh_layer_id equal to spslayerId.

pps_seq_parameter_set_id specifies the value of sps_seq_parameter_set_id for the SPS. The value of pps_seq_parameter_set_id shall be in the range of 0 to 14, inclusive. The value of pps_seq_parameter_set_id shall be the same in all PPSs that are referred to by coded pictures in a CLVS.

Additionally, in one example the value 63, may be kept reserved for syntax element pps_pic_parameter_set_id for future extensions. It should be noted that in JVET-R2001 syntax element pps_pic_parameter_set_id is coded as a u(6) code and in ITU-T H.265 syntax element pps_pic_parameter_set_id is coded as a ue(v) code. In one example, according to the techniques herein, the semantics of syntax element pps_pic_parameter_set_id and ph_pic_parameter_set_id, which is included in a picture header syntax structure, may be based on the following:

A PPS RBSP shall be available to the decoding process prior to it being referenced, included in at least one AU with TemporalId less than or equal to the TemporalId of the PPS NAL unit or provided through external means. All PPS NAL units with a particular value of pps_pic_parameter_set_id within a PU shall have the same content.

pps_pic_parameter_set_id identifies the PPS for reference by other syntax elements.

PPS NAL units, regardless of the nuh_layer_id values, share the same value space of pps_pic_parameter_set_id. The value of pps_pic_parameter_set_id shall be in the range of 0 to 62, inclusive. The value 63 for pps_pic_parameter_set_id is reserved for future use by ITU-T I ISO/IEC.

Let ppsLayerId be the value of the nuh_layer_id of a particular PPS NAL unit, and vclLayerId be the value of the nuh_layer_id of a particular VCL NAL unit. The particular VCL NAL unit shall not refer to the particular PPS NAL unit unless ppsLayerId is less than or equal to vclLayerId and all OLSs specified by the VPS that contain the layer with nuh_layer_id equal to vclLayerId also contain the layer with nuh_layer_id equal to ppslayerId.

NOTE—In a CVS that contains only one layer, the nuh_layer_id of referenced PPSs is equal to the nuh_layer_id of the VCL NAL units.

ph_pic_parameter_set_id specifies the value of pps_pic_parameter_set_id for the PPS in use. The value of ph_pic_parameter_set_id shall be in the range of 0 to 62, inclusive.

It is a requirement of bitstream conformance that the value of TemporalId of the PH shall be greater than or equal to the value of TemporalId of the PPS that has pps_pic_parameter_set_id equal to ph_pic_parameter_set_id.

In this manner, source device 102 represents an example of a device configured to signal a syntax element in a sequence parameter set syntax structure specifying a maximum number of temporal sublayers that may be present in each coded video sequence referring to the sequence parameter set, signal a syntax element specifying a chroma sampling, and signal a syntax element specifying a luma coding tree block size, wherein the syntax element specifying a chroma sampling and the syntax element specifying a luma coding tree block size immediately follow the syntax element specifying a maximum number of temporal sublayers.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I²C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device.

For example, interface 122 may include a chipset supporting PCI and PCIe bus protocols, proprietary bus protocols, USB protocols, I²C, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
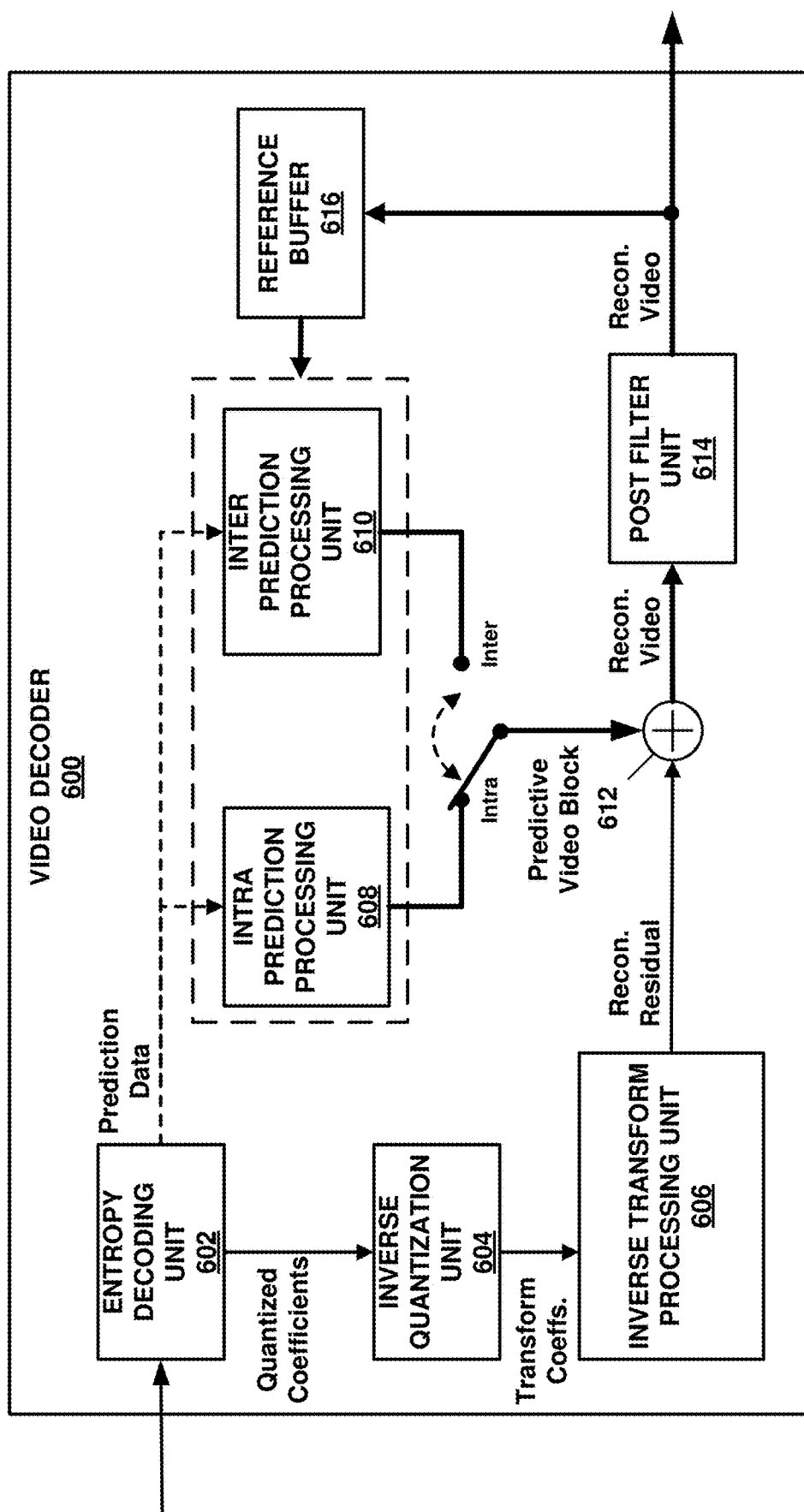
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-7. Video decoder 600 may decode a picture based on or according to the processes described above, and further based on parsed values in Tables 1-7.

In the example illustrated in FIG. 6, video decoder 600 includes an entropy decoding unit 602, inverse quantization unit 604, inverse transform coefficient processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and prediction data from a bitstream. In the example, illustrated in FIG. 6, inverse quantization unit 604 and inverse transform coefficient processing unit 606 receive a quantization parameter, quantized coefficient values, transform data, and prediction data from entropy decoding unit 602 and output reconstructed residual data.

Referring again to FIG. 6, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a syntax element in a sequence parameter set syntax structure specifying a maximum number of temporal sublayers that may be present in each coded video sequence referring to the sequence parameter set, parse a syntax element specifying a chroma sampling, and parse a syntax element specifying a luma coding tree block size, wherein the syntax element specifying a chroma sampling and the syntax element specifying a luma coding tree block size immediately follow the syntax element specifying a maximum number of temporal sublayers.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of decoding video data, the method comprising:
    receiving a sequence parameter set;
    parsing a first syntax element sps_ptl_dpb_hrd_params_present_flag specifying whether a profile tier level syntax structure is present in the sequence parameter set;
    parsing the profile tier level syntax structure based on the first syntax element sps_ptl_dpb_hrd_params_present_flag;
    parsing a second syntax element sps_gdr_enabled_flag specifying whether gradual decoding refresh pictures are enabled; and
    parsing a third syntax element sps_ref_pic_resampling_enabled_flag, immediately after parsing the second syntax element sps_gdr_enabled_flag, specifying whether reference picture resampling is enabled.

2. A device comprising one or more processors configured to:
    receive a sequence parameter set;
    parse a first syntax element sps_ptl_dpb_hrd_params_present_flag specifying whether a profile tier level syntax structure is present in the sequence parameter set;
    parse the profile tier level syntax structure based on the first syntax element sps_ptl_dpb_hrd_params_present_flag;
    parse a second syntax element sps_gdr_enabled_flag specifying whether gradual decoding refresh pictures are enabled; and
    parse a third syntax element sps_ref_pic_resampling_enabled_flag, immediately after parsing the second syntax element sps_gdr_enabled_flag, specifying whether reference picture resampling is enabled.

3. A method of signaling parameters for video data, the method comprising:
    signaling a first syntax element sps_ptl_dpb_hrd_params_present_flag specifying whether a profile tier level syntax structure is present in a sequence parameter set;
    signaling the profile tier level syntax structure based on the first syntax element sps_ptl_dpb_hrd_params_present_flag;
    signaling a second syntax element sps_gdr_enabled_flag specifying whether gradual decoding refresh pictures are enabled;
    signaling a third syntax element sps_ref_pic_resampling_enabled_flag, immediately after signaling the second syntax element sps_gdr_enabled_flag, specifying whether reference picture resampling is enabled; and
    signaling the sequence parameter set including the first syntax element, the second syntax element and the third syntax element.

* * * * *